(12) United States Patent
Puskarich et al.

(10) Patent No.: US 12,014,100 B1
(45) Date of Patent: Jun. 18, 2024

(54) CONTEXTUAL INFORMATION DELIVERY SYSTEM

(71) Applicant: Apple Inc., Cupertino, CA (US)

(72) Inventors: Paul G. Puskarich, London (GB); Fiona P. O'Leary, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/816,184

(22) Filed: Jul. 29, 2022

Related U.S. Application Data

(60) Provisional application No. 63/261,568, filed on Sep. 23, 2021.

(51) Int. Cl.
| | | |
|---|---|---|
| *G06F 3/14* | (2006.01) | |
| *G06F 3/01* | (2006.01) | |
| *G06F 3/0346* | (2013.01) | |
| *G06V 20/50* | (2022.01) | |
| *G06V 40/10* | (2022.01) | |

(52) U.S. Cl.
CPC ............ *G06F 3/1423* (2013.01); *G06F 3/011* (2013.01); *G06F 3/0346* (2013.01); *G06V 20/50* (2022.01); *G06V 40/10* (2022.01)

(58) Field of Classification Search
CPC ...... G06F 3/1423; G06F 3/0346; G06F 3/011; G06V 40/10; G06V 20/50
See application file for complete search history.

(56) References Cited

U.S. PATENT DOCUMENTS

| | | | |
|---|---|---|---|
| 2010/0077484 A1* | 3/2010 | Paretti | H04W 4/023 726/1 |
| 2014/0099931 A1* | 4/2014 | Root | H04W 4/021 455/414.3 |
| 2014/0274144 A1* | 9/2014 | Des Jardins | H04N 21/47202 455/456.3 |
| 2017/0076361 A1* | 3/2017 | Levesque | G06Q 30/0633 |
| 2017/0201689 A1* | 7/2017 | Zilberman | H04N 21/4223 |
| 2018/0039855 A1* | 2/2018 | Kecskemeti | G06F 21/6254 |

* cited by examiner

*Primary Examiner* — Stephen G Sherman
(74) *Attorney, Agent, or Firm* — Dorsey & Whitney LLP

(57) ABSTRACT

Electronic devices are used to provide content data and information to users based on their positional and user contexts. Methods and systems herein determine locations of the devices and provide content data from the devices based on their locations and based on content delivery settings, categories, and classifications. Some methods include distribution systems for providing content data and settings to a devices based on their locations. Thus, content data delivered by the devices is prioritized to improve the utility of the devices and the information they present. When multiple electronic devices are brought into proximity with each other, they can also interact to provide content data in different ways, including splitting up the content data, showing extensions, enlargements, or expansions of the content data, or otherwise differentiating the data provided by each device to improve the utility of the information provided by the devices.

35 Claims, 12 Drawing Sheets

CONTEXTUAL INFORMATION DELIVERY SYSTEM

CROSS-REFERENCE TO RELATED APPLICATION(S)

This application claims the benefit of U.S. Provisional Patent Application No. 63/261,568, filed 23 Sep. 2021, and entitled "CONTEXTUAL INFORMATION DELIVERY SYSTEM," the entire disclosure of which is hereby incorporated by reference.

FIELD

The described embodiments relate generally to systems for providing information using electronic devices based on the context of the device displaying the information.

BACKGROUND

Electronic devices have become an integral part of life around the world. Progress in the development and implementation of smartphones, smart watches, home automation devices, vehicles, tablet computers, and other devices have made them prevalent and commonplace. Many of these devices are built to receive and provide information to a user, such as by providing telephone calls, video calls, electronic "notifications," texts, pictures, video messages, and more. Although these devices have thereby connected people in ways never before seen, they also have in some ways become a burden on users' time and attention. In part, this burden is caused by the volume of information presented in a steady stream to a user's device. Information is delivered that may not be necessary or important in the context of the device delivering the content. There is a constant need for improvements to the delivery and presentation of information to users through electronic devices.

SUMMARY

An aspect of the disclosure relates to a method of managing content delivery from an electronic device, with the method comprising receiving, at a processor of an electronic device, content data, determining, via the processor, a location of the electronic device, determining, via the processor, a content delivery category for the location, and in response to determining, via the processor, that the content data fits within the content delivery category, delivering the content data via the electronic device.

In some embodiments, the content delivery category can be based on a privacy level of the location. The privacy level of the location can be based on a user input, on an activity performed at the location, a number of persons or other electronic devices at the location, or a capability of another electronic device detected at the location.

In some embodiments, the content delivery category can be based on an activity performed at the location. The content data can comprise a first piece of content data and a second piece of content data, and the method can further comprise prioritizing the first piece of content data and the second piece of content data based on the location and sequentially delivering, via the electronic device, the first piece of content data and the second piece of content data based on the prioritization.

In some embodiments, the content delivery category can be based on a time, a date, or a season at the location.

Another aspect of the disclosure relates to a method of distributing content to an electronic device, wherein the method comprises receiving content data, identifying multiple potential recipient devices of the content data, determining locations of the multiple potential recipient devices, determining a subset of the multiple potential recipient devices based on the locations, determining content delivery settings for the content data, and sending the content data and the content delivery settings to the subset of the multiple potential recipient devices.

In some arrangements, the multiple potential recipient devices can be identified based on enrollment of the multiple potential recipient devices in an organization. The multiple potential recipient devices can be identified based on a time, a date, or a season. In some configurations, determining locations of the multiple potential recipient devices can include determining a privacy characteristic of each location of the locations of the multiple potential recipient devices, and the subset of the multiple potential recipient devices can be determined based on the privacy characteristic of each location.

Determining locations of the multiple potential recipient devices can include determining an activity performed at each location of the locations of the multiple potential recipient devices, and the subset of the multiple potential recipient devices can be determined based on the activity performed at each location.

The content delivery settings can include a delay for delivering the content data to the subset of the multiple potential recipient devices or can include delivering the content data in response to an interaction with an electronic device of the subset of the multiple potential recipient devices.

The content delivery settings can also include immediately delivering the content data to the subset of the multiple potential recipient devices upon receipt of the content data by the subset of the multiple potential recipient devices.

Yet another aspect of the disclosure relates to a method of determining a context of an electronic device in a local environment, wherein the method comprises: receiving a signal from a sensor of a content delivery device, the signal indicating a presence of an object in a local environment surrounding the content delivery device; determining an identity characteristic of the object; determining a context of the local environment based on the identity characteristic; and providing a content delivery setting for the content delivery device based on the context of the local environment.

In some embodiments, the signal indicates a number of objects in the local environment; and the context of the local environment is determined based on the number of objects. The signal can include electronic image data including at least a portion of the object, and determining the identity characteristic can comprise identifying the object in the electronic image data. The object can include a person, the identity characteristic can include an identity of the person; and the context of the local environment can include a room category based on the person identified. In some configurations, determining an identity characteristic can include detecting an orientation of the content delivery device.

Yet another aspect of the disclosure relates to a method of displaying content on multiple electronic devices, with the method comprising: displaying a first set of content data using a first display of a first electronic device; detecting, using a sensor of the first electronic device, a second electronic device; determining a position of the first electronic device relative to the second electronic device based on output of the sensor; providing, via the first display of the first electronic device, a second set of content data based on the position of the first electronic device; and providing, via a second display of the second electronic device, a third set of content data based on the position of the first electronic device.

In some embodiments, the second set of content data and the third set of content data can include an enlarged portion of the first set of content data. The second set of content data can comprise subject matter equivalent to subject matter of the first set of content data. The third set of content data can be an extension of the second set of content data. The third set of content data can be a visual extension of the second set of content data. In some embodiments, the method further comprises sensing a user input and moving content data displayed by the first display of the first electronic device to the second display of the second electronic device in response to the user input.

Detecting the second electronic device can comprise detecting contact between the first electronic device and the second electronic device. The method can also comprise detecting an orientation of the first electronic device relative to the second electronic device.

Another aspect of the disclosure relates to an electronic device, comprising a first display; a sensor; and a processor in electronic communication with a memory device, with the memory device storing instructions that, when executed by the processor, cause the processor to: display visual content on the first display; detect an external electronic device via the sensor, the external electronic device having a second display; determine a position of the second display relative to the first display; and transmit a signal to the external electronic device to display additional visual content on the second display. The additional visual content can include an extension of the visual content of the first display based on the position of the second display relative to the first display.

The sensor can include a radar, a LiDAR, an ultrasonic sensor apparatus, an ultra wideband sensor, an accelerometer, an electric field sensor, a magnetic field sensor, or a gyroscope. In some arrangements, the sensor can include a contact sensor; and determining a position of the second display relative to the first display includes detecting contact between the first display and the second display using the contact sensor. The instructions can further cause the processor to split the visual content of the first display into two portions; and the additional visual content can include one of the two portions of the visual content. The additional visual content can include an enlarged portion of the visual content of the first display.

Other technical features may be readily apparent to one skilled in the art from the following figures, descriptions, and claims.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
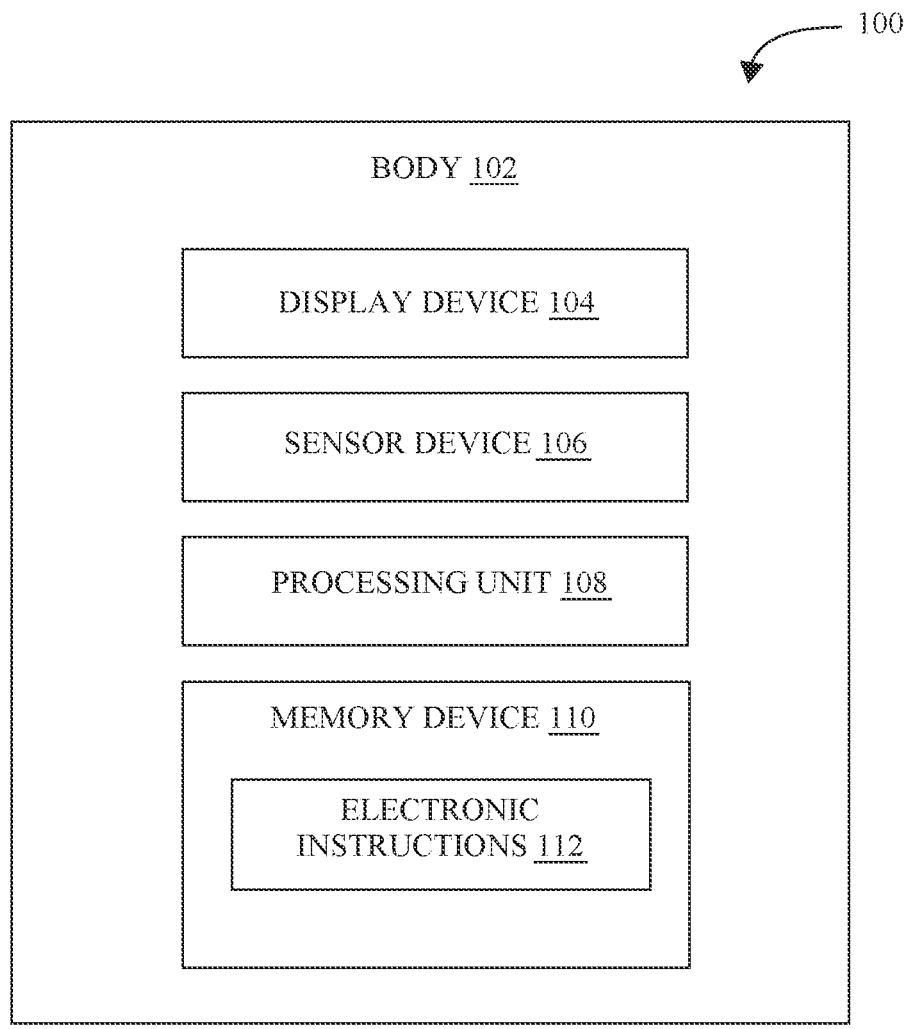
FIG. 1 illustrates a block diagram of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Aspects of the present disclosure relate to electronic devices and content data sent between electronic devices and provided to users. The lives of billions of people have been transformed by the inclusion of electronic communications in everyday activities, but in some ways those devices have become a conduit for delivery of an overwhelming amount of information. Computing devices and similar electronic devices such as smartphones, tablet computers, smart watches, smart appliances, advanced computerized vehicles, and more, are capable of providing wide-ranging types of information, and in some ways the amount of information they provide hinders their ability to be effective at communicating the most important or relevant information to users in appropriate contexts (i.e., appropriate manners, times, and places). The operators of these devices can therefore easily miss important information when a wave of notices, alerts, news, emails, text messages, images, sounds, haptic indicators, advertisements, and so on are sent via the same feed or channel. This can lead to extremes where the notifications are ignored or users develop unwanted habits of continuously checking for notifications.

Aspects of the present disclosure relate to devices that are enabled to provide specialized content delivery based on various factors, including, for example, the location of the device, the type of device and its capabilities, a positioning and orientation of the device, the proximity of the device to other devices, the types of activities performed with or near the device, and more. Furthermore, a capable electronic device can have the delivered content filtered or sorted based on a user profile, their memberships, preferences, interests, location, and other nearby devices. In this manner, the utility of the electronic device can be focused on providing the most important and relevant information to a user based on a priority or sorting system that keeps unwanted or unneeded information out of sight until contextually appropriate for the user.

In an example embodiment, a system can manage content delivery from an electronic device by receiving content data, determining a location of the electronic device, determining a content delivery category for the location of the electronic device, and, in response to determining that the content data fits within the content delivery category, delivering the content data via the electronic device. Users or other predefined settings or algorithms can define content data categories such as user characteristics (e.g., gender, age, address, current location, education, religious affiliation, club memberships, institutional enrollments, device ownership, hobbies, etc.), and those characteristics can be used to control how certain information is presented to the user (e.g., being presented immediately/with high priority, being presented with a delay/less priority, or never presented/no priority/on standby).

Additionally, methods of distributing content to electronic devices are provided which can include receiving content data, identifying multiple potential recipients of the content data, determining locations of the multiple potential recipients, determining a subset of the multiple potential recipients based on the locations, determining content delivery settings for the content data, and sending the content data and the content delivery settings to the subset of the multiple potential recipients. Thus, the sorting or categorization of content data being provided to a user can be determined locally, such as at the recipient or intended consumer of the content data (e.g., by a user's computing device), or the sorting or categorization can be produced remotely, such as by the producer, sender, or originator of the content data. In the latter case, the sorting or categorization can be used to identify sets of recipients that should be prioritized or targeted over others in order to improve user engagement and the overall effectiveness of the communication of the information to the consumers.

Some aspects of the present disclosure relate to methods for determining a setting, context, or location characteristics of an electronic device, such as by determining the ways the electronic device is being used and what kinds of activities are performed in its vicinity. The methods can also include determining the types or kinds of notifications and delivery settings that are appropriate for that context. Thus, electronic devices for delivering information can be adaptable to the local environments in which they are connected so that consumers of the information receive the most important information where it is needed most.

Furthermore, aspects of the present disclosure relate to methods for controlling the amounts, subject matter, and types of information provided by at least one display of a set of electronic devices. An example embodiment includes displaying a first set of content data using a first display of a first electronic device, detecting, using a sensor of the first electronic device, a second electronic device, determining a position of the first electronic device relative to the second electronic device based on output of the sensor, providing, via the first display of the first electronic device, a second set of content data based on the position of the first electronic device, and providing, via a second display of the second electronic device, a third set of content data based on the position of the first electronic device. In this manner, content data provided by one device can have a first configuration, and the introduction or detection of a second device can cause the two devices to collectively show the content data in a second configuration or to show different content data as a result of their movement into proximity with (or a predetermined orientation relative to) each other. As a result, the content data can be extended or enlarged across multiple electronic devices, can be divided and displayed separately on different devices, and more.

These and other embodiments are discussed below with reference to the figures. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a block diagram of an electronic device 100 of an embodiment the present disclosure. The electronic device 100 is schematically shown as including a body 102 supporting at least a display device 104, a sensor device 106, a processing unit 108, and a memory device 110. The electronic device 100 can include a device used to provide information to a viewer via the display device 104. In some embodiments, the electronic device 100 can include a smartphone, a tablet computer, a smart home device (e.g., a home control center, thermostat, security system control device, or similar device), a desktop computer, a laptop computer, similar devices, and combinations thereof.

The body 102 can be a housing or enclosure for supporting or protecting the other components of the electronic device 100. In some embodiments, the body 102 can include a shell made of plastic, metal, wood, and ceramic materials. The body 102 can be mountable to a support surface such as a stationary structure (e.g., a wall, cupboard, vanity mirror, etc. (see FIG. 4)), a movable structure (e.g., a vehicle frame/trim/dashboard, furniture, door, repositionable stand (see FIG. 5), etc.), or combinations thereof. For instance, the body 102 can have mounting points, fasteners, bolts, clips, magnets, adhesive strips, hanging hooks, or other attachment devices to retain the body 102 to a support structure or support surface. In an example embodiment, the body 102 can be configured to mount to a vertical support surface, such as a refrigerator, bathroom mirror, wall, or post, and the display device 104 can be positioned in the body 102 in a manner facilitating consumption of information it displays. In some embodiments, the body 102 is a portable structure configured to be carried by a user from one location to another, such as a body of a smartphone or similar communications device. In other embodiments, the body 102 is made to be at least semi-permanently installed in a location, such as by being hard-wired to a power line in a wall or installed in a dashboard of a vehicle.

The display device 104 is an example of an output device that can be used with the electronic device 100. Thus, the display device 104 can be a display screen (e.g., a liquid crystal display (LCD) or light emitting display (LED) screen) that can be electronically controlled to present visible information to a viewer. In some embodiments, a different output device can be used instead of, or in addition to, display device 104, such as an audio loudspeaker, bell, chime, or haptic output device (e.g., a piezoelectric actuator configured to induce motion of at least a portion of the electronic device 100 to provide touch-based feedback (e.g., vibration or haptic pulses)). The display device 104 can be used to output content data such as visual images, text, videos, symbols, animations, and related viewable information for consumption by a user of the electronic device 100.

The sensor device 106 can include at least one sensor arranged to receive or transduce input from an external source. Thus, the sensor device 106 can include a button, a switch, a capacitive touch sensor, or other input device used to receive input when coming into contact with an appendage of the user. In some embodiments, the sensor device 106 can include a microphone or similar device used to detect audible input (e.g., voice commands or similar sounds).

The sensor device 106 can include a networking device such as an antenna and related electronics for wireless communications with other electronic devices via a wireless communications protocol such as, for example, BLUETOOTH®, Wi-Fi, ultra wideband, ZIGBEE, cellular network protocols (e.g., Long-Term Evolution (LTE) or "5G" wireless network connectivity), similar communications standards, and combinations thereof. Thus, the sensor device 106 can be used to detect other nearby electronic devices and to at least receive information from other electronic devices (e.g., another electronic device 100 or a different device outputting an electronic signal). Particularly, the sensor device 106 can be used to detect devices that are on a common wireless communications network, such as a local area network (LAN) (e.g., a wireless LAN), other BLUETOOTH® devices, other ultra wideband devices, etc. In some embodiments, the sensor device can include a receiver for location detection, such as, for example, a global positioning system (GPS) receiver configured to determine the position of the sensor device 106 relative to the earth and/or satellites.

In some embodiments, the sensor device 106 can include a light sensor such as an infrared light sensor, a camera/image-capturing device, an ultraviolet sensor, or similar device. With a light sensor, the electronic device 100 can be used to measure the intensity or direction of ambient light. In some embodiments, the sensor device 106 can include a camera device used with the electronic device 100 in conjunction with a computer vision/image recognition algorithm (e.g., as implemented by electronic instructions 112 on memory device 110) to detect and identify objects, persons, colors, gauge a distance between the electronic device 100 and the sensor device 106, etc. The process of determining objects and persons can be referred to as determining an identity characteristic, such as a property indicating an object's identity or an identity of a person or user. Furthermore, the sensor device 106 can include a position or location sensor such as an accelerometer, gyroscope, gravitational direction sensor, similar devices, and so on. These sensors can be used to detect movements of the electronic device 100 or nearby objects so that the context of the electronic device 100 can be inferred.

In some embodiments, the display device 104 and sensor device 106 can be implemented as a touchscreen device, wherein the electronic device 100 is enabled to receive input such as by sensing a capacitive touch input from a user at or near the surface of the display device 104 or by receiving touch input by generating a resistive signal where the surface of the display device 104 is touched by the user. The touchscreen device can also be used as the display device 104 to output information to onlookers.

The processing unit 108 can include a processor, central processing unit (CPU), control logic board, printed circuit board (PCB) or similar device used to implement electronic instructions 112 stored by the memory device 110. See also FIG. 15. The electronic instructions 112 can include instructions for operations that control the output of managing content delivery and/or distribution to and/or from the display device 104 of the electronic device 100 based at least in part on the location of the electronic device 100 as determined at least in part by the sensor device 106, as explained in further detail below. See FIGS. 3-14 and their related descriptions herein.

Figure 2:
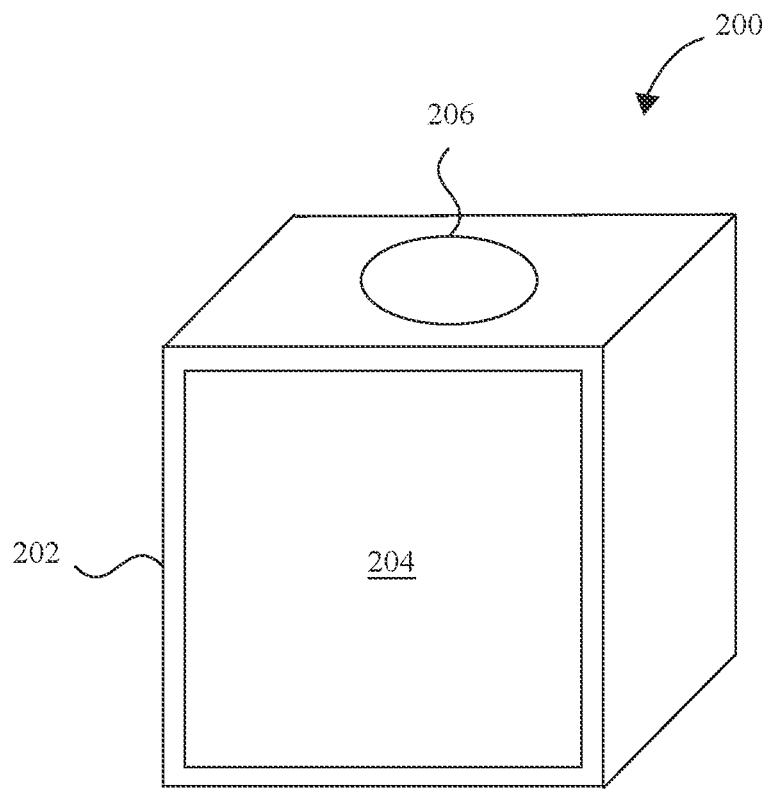
FIG. 2 illustrates a schematic view of an embodiment of the electronic device of FIG. 1.

FIG. 2 illustrates an example embodiment of a mountable visual display 200 that can be used as an electronic device 100. The mountable visual display 200 includes a housing 202 containing a visual display screen 204 (e.g., a display device 104) that is configured to be viewed through a front side of the mountable visual display 200. One or more sensor 206 (e.g., a sensor device 106) can be included on or within an outer surface of the housing 202. In FIG. 2, the sensor 206 is positioned on a lateral side surface, but in some embodiments, the sensor 206 can be positioned on a front surface (i.e., next to, in front of, or behind display screen 204) or a rear surface. If the sensor 206 is a directional sensor such as a camera or directional microphone, the sensor 206 can be positioned on the housing 202 in a manner that maximizes its efficiency, such as by being positioned on a side of the housing 202 pointing at least partially in the direction of expected application of input to the sensor 206. In some embodiments, the sensor 206 can be substantially non-directional, such as by being a GPS receiver or Wi-Fi receiver, and can therefore detect the targeted signal type (e.g., GPS or Wi-Fi signal) from substantially any direction. In that case, the sensor 206 can beneficially be located at any outer surface of, or within, the housing 202.

The mountable visual display 200 can be configured as a portable device that is movable by a user carrying the housing 202 in his or her arms or by hand. The mountable visual display 200 can therefore include mounting portions such as magnets, suction cups, or hooks to retain the housing 202 to an external surface such as a metal plate (e.g., a metal structure of a refrigerator), a mirror, a pegboard, a window, a cork board, drywall, wood, tile, concrete, and so on. Generally, the mounting portions of the mountable visual display 200 can be used to hold the position the display screen 204 and sensor 206 in a direction for efficient and comfortable viewing (e.g., within 10 feet or less for a display device) or in a direction for efficient data gathering (e.g., facing the center of a room for a camera-based sensor device).

The electronic device 100 can be used to receive content data (e.g., via a communications interface) and can be used to deliver the content data to a user (e.g., via the display device 104). The context and location of the electronic device 100 can be a factor in determining what information is presented and when and how it is presented. Thus, when a user has multiple electronic devices 100 or when a user has an electronic device 100 and another computing device (e.g., a smartphone or computer), each device can be controlled to provide different types of content data or to provide content data at different times or in different ways. In this manner, a consumer of the content data can be presented with an optimized feed of the most appropriate and relevant content data for their needs and interests based on their location.

For example, an electronic device 100 can be positioned in various locations and zones of varying sizes and types. The position and/or location of the electronic device 100 can be used to determine what information should be output by the electronic device 100 and to determine how that information is output, if at all. The characteristics and nature of the location of the electronic device 100 (i.e., the local context of the device) can be used as a factor in determining what information is provided, when it is provided, and how the information is presented. For instance, an electronic device 100 can be used to display private information when it is positioned and located somewhere that is determined to be a private area, and the private information can be hidden by (or not provided to) the electronic device 100 if the display is being used in a location identified or determined to be a public/non-private area or if the private area is detected to have changed its nature (e.g., there are additional or unknown persons present in the area). Thus, the location of the electronic device 100 can be detected/sensed/identified (e.g., using sensor device 106) or received as a user input, and the location of the electronic device can be used to determine a content delivery category for the electronic device 100 that guides how content data is delivered by the electronic device 100 when implementing the electronic instructions 112. See FIG. 3 and its related descriptions herein.

Figure 3:
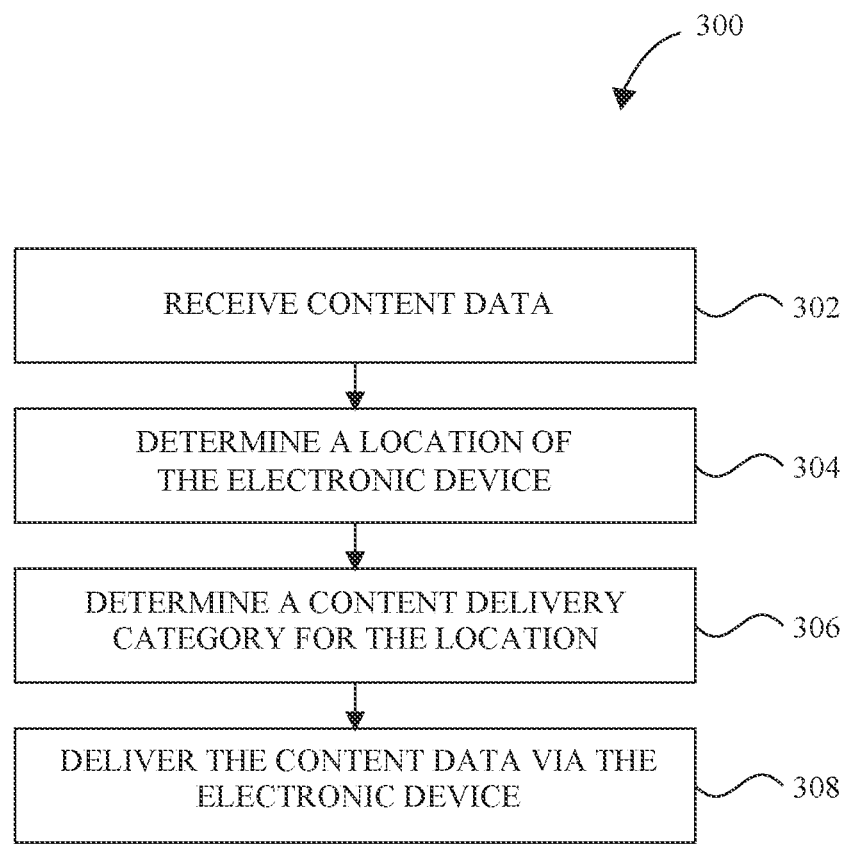
FIG. 3 illustrates a process flowchart of a method of managing content delivery from an electronic device.

FIG. 3 illustrates a flowchart of a process 300 (e.g., electronic instructions 112) that can be implemented as part of the electronic instructions 112 used by the electronic device 100 to manage content data delivery from the electronic device 100 (e.g., via the display device 104). The process 300 can include receiving content data, as shown in block 302. Receiving content data can include receiving data from an outside source of content data such as, for example, from an external computing device, and provided to the electronic device 100 via a communications interface (e.g., a wireless communications interface, as described above). "Content data" is information that is intended, at least in part, to be provided to a consumer for viewing or other consumption. For instance, the content data can include an incoming telephone call signal and associated caller identification information that will be sent to the electronic device 100 and displayed or otherwise conveyed when a call is initiated to the user's phone number. In one case, the content data can be generated from an external computing device and can then be provided to a network to which the electronic device 100 is connected. See FIG. 7 and its related descriptions herein. Various kinds of content data can include images, text, videos, sounds, haptic vibrations, emails, numbers, symbols, similar indications, and combinations thereof.

In some cases, the content data can be generated by the electronic device 100 itself, such as by generating a notification to the user of a certain time, a calendar event, timer status, ambient temperature, and so on. Content data can be generated based on information stored by the electronic device 100 (e.g., based on a record of interactions with the device or based on user input previously provided to the device), based on a schedule, or based on current or historical conditions sensed by the electronic device 100 (e.g., by sensor device 106). This device-generated content data can be "received" for the purpose of block 302 when it is triggered or created by the electronic device 100 and is in a state sufficient to be presented to the user. Device-generated content data can also be considered "received" when a certain time or scheduled event occurs, such as a message being generated when a meeting is scheduled to begin soon, and the content data is processed by a processing unit 108 for delivery via the display device 104 or other output device.

In some cases, the content data can be generated in response to inputs from a user. For example, the user can interact with the electronic device 100 to produce content data to be delivered by the electronic device 100 at a later time, such as by storing notes, reminders, timers, and similar inputs provided to the electronic device 100. This content data can also be considered "received" when a certain time event occurs or when the content data is requested for delivery via the processing unit 108 and display device 104.

When content data is received in block 302, the process 300 can include determining a location of (or contextual information related to) the electronic device 100 in block 304. The location of the electronic device 100 can be determined as an absolute position (e.g., coordinates relative to the earth such as latitude and longitude, a mailing address or nearby landmark, an IP address on a network, and so on), as a relative position (e.g., a point at a determined or estimated distance from at least one other object), as a type or category of location (e.g., in a kitchen, in a house, in an office, indoors, outdoors, in a library, in a public area, in a private area, at a party, in the presence of strangers/unknown persons, in the presence of emergency personnel, etc.), or in a non-specific area (e.g., somewhere in a building, city, county, state, region, country, etc.). Ways that location can be detected and determined are further described in connection with FIG. 4 below.

Once the location of the electronic device is determined, the process 300 can include determining a content delivery category for the location of the electronic device 100, as indicated in block 306. A content delivery category defines rules for how the content data should be delivered by the electronic device 100 in block 308. These content delivery categories can be classified based on their importance or urgency level to the user, a time or place in which they should be provided, characteristics of the content data itself, characteristics of the electronic device(s) to which the content data is sent, and so on.

Content delivery categories can have a time factor or distance factor, wherein content data can be delivered or presented via the electronic device 100 immediately, on a delay or schedule, in response to a certain user interaction or input, or upon detection of certain conditions (e.g., based on the detecting that the device is at a distance from another location or that the device is within a range of distances to another location). The content data can be prioritized in a database or list with other content data received or stored by the electronic device 100, such as other pending or scheduled alerts and notifications, and the content data in that prioritized data set can be delivered in various ways from the electronic device 100 based on their assigned content delivery categories, as discussed further in connection with block 308.

In some embodiments, assignment of a content delivery category in block 306 can therefore include determining an importance or urgency level of the content data for the location, or the content delivery category assigned to the content data can have a predetermined importance or urgency level. Some content data can have an overriding urgency level that makes it appropriate to deliver by any electronic device 100 that receives the content data in any location (e.g., a fire or security alarm). Some content data can have an importance or urgency level that changes based on the context of where it will be delivered, such as information that has high importance or urgency only when the electronic device 100 is in a private setting and that takes less importance or urgency when in a public setting (e.g., a reminder for a user to take a certain medication).

Similarly, the prioritization or urgency of the content data can be higher when the electronic device 100 is in a location where certain user actions are generally taken (e.g., the prioritization can be based on the distance (i.e., spatial/geographical or temporal/time distance) between the electronic device 100 and a place where the user can take action on the content data when it is delivered). In an example embodiment, content data related to a reminder to buy certain grocery items may have higher prioritization for delivery by an electronic device 100 located near an exit door location in a home as compared to a bedroom location in the same home since the user is much more likely to have an opportunity to buy the grocery items soon after leaving through the exit door than while resting in the bedroom. Similarly, in an example embodiment, content data related to an oven timer can have higher priority when the electronic device 100 is located in the kitchen as compared to devices in other areas in the house since a user action of operating the oven is much more likely when he or she is in the kitchen. In another example embodiment, content data related to a local festival advertisement can have higher priority for delivery via nearby electronic devices as the current date gets closer to the date of the festival or as the device is positioned closer to the location of the festival. An electronic device 100 in the same town as the festival would present the message with higher priority than an electronic device 100 in the next county over.

In some embodiments, the location and context of the electronic device 100 can be used to determine that certain content data is filtered out or not delivered by the electronic device 100 at all, or at least while the electronic device 100 is in its current location. For instance, content data can be filtered if a user provided an input setting of "do not disturb" during a certain time or has unsubscribed from that content. Content data that is filtered or otherwise not delivered can be stored on the electronic device 100 for future delivery (i.e., when the electronic device 100 is moved to an acceptable location) or can be deleted, modified, or otherwise removed.

Content delivery categories can also have an output type factor or characteristic, wherein content data can be delivered or presented via certain designated types of output devices. The process 300 can include determining which types of output devices of the electronic device 100 are compatible with the content data and then assigning a content delivery category for the content data based on those compatible output devices. For example, content data that includes a sound file can be assigned a content delivery category at least partially based on the understanding that the sound will be potentially heard by all individuals at the location. A private audible message would therefore not be delivered when the device is in a public location, or the private sound file would be delivered as a notification that a sound file is waiting for the user and would require user input (e.g., entering a passcode or other user authentication) to be replayed. Alternatively, a private sound file could have its content delivery category set for transcription of the words in the sound file so that the content can be delivered via the electronic device 100 as a text message (which is in some cases more private than replaying the sound from a speaker of the electronic device 100). Similarly, content data that includes an image or text can be assigned a content delivery category based on whether it should be visible or readable by all individuals at the location. The output type factor can also include a setting for how the output should be provided using the output device/display device of the electronic device 100, such as its volume and playback speed (for sounds) or its brightness, size, font, color, etc. (for images and text).

In some embodiments, content delivery categorization can be based on classifying the place at which the content data will be delivered, which classification can be determined in connection with block 304. As discussed elsewhere herein, the location of the electronic device 100 can be classified based on its privacy (e.g., whether it is a public location or a private location), its function (e.g., a kitchen, a hallway, a living room, a bathroom, a bedroom, a lobby, a gym, an office, a vehicle, a school, a library, a hospital, a store, a restaurant, a storage area, etc.), the number and/or type of occupants of the area near the electronic device 100 (e.g., whether the zone of detection around the device includes one person, multiple persons, children, animals, etc.), its geographic location (e.g., its address, latitude/longitude, city/state, elevation/altitude, etc.), the amount of light, sound, motion, or other physical characteristics detected or sensed in the area, similar features, and combinations thereof (e.g., delivering content data when the location gets dark or bright, it gets loud or quiet, or when one or more people walk past the electronic device 100). Thus, the prioritization of the delivery of content data can change based on the context of each location and the device's characteristics. In some cases, the context characteristics of a location can change over time (e.g., getting brighter/darker, becoming more/less private, detecting objects indicating one room type (e.g., living room) or another room type (e.g., kitchen)), and the delivery of content data can accordingly change to appropriately reflect the conditions and context of the location as a result.

In some embodiments, content delivery categorization can be based on classifying the time at which the content data will be delivered. For instance, the time for content delivery can be categorized as being "at night," "during the day," "after dinner," "when school starts," and so on. Thus, the prioritization of the delivery of content data can change based on the time of day or based on the time that a detected event near the electronic device 100 occurs.

Additionally, content delivery categorization can depend on the content data itself. The content data can be scanned or analyzed as part of block 306 to determine whether certain words, symbols, images, videos, or other content data are in the content data received in block 302. If certain pieces of content data are found, the categorization of the content data can be influenced. For instance, upon determining that a message is from a bank and has a currency symbol in the text, the process 300 can flag the content data as being potentially private and therefore not assigning a high priority to deliver the content if the electronic device 100 is in a public setting. Likewise, content data related to movie recommendations can be categorized for priority delivery in a room where a television is present as opposed to a bathroom or hallway location. Additionally, detecting a face of a user in an image of content data can increase the priority of providing the content to that user when the user is detected by the electronic device 100.

The process 300 can also include delivering the content data via the electronic device, as indicated in block 308. Delivering the content data can include providing the information via the electronic device 100, such as by displaying an image or text using the display device 104, playing a sound over a speaker, or outputting haptic feedback (e.g., vibrations or pulses) using a touch feedback device. In some embodiments, one piece of content data can be provided at a time, and multiple pieces of content data can be presented sequentially based on their prioritization and categorization (e.g., as determined in connection with block 306).

Figure 4:
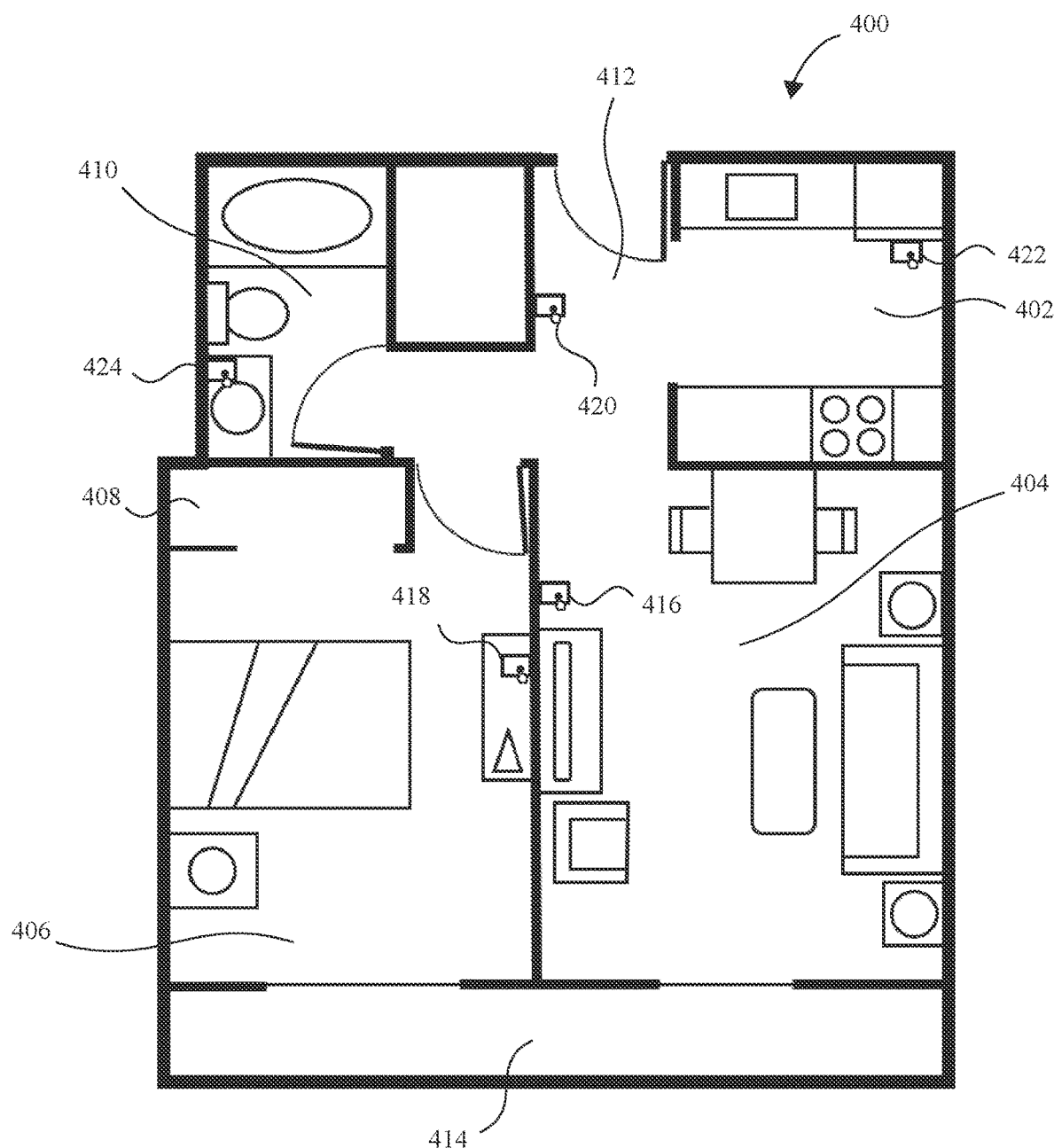
FIG. 4 illustrates a floorplan of a residence in which multiple electronic devices are located.

FIG. 4 illustrates how an electronic device can be operated to determine its location and context characteristics. These processes can be used as part of determining the location of the electronic device in block 304 and as part of determining a content delivery category in block 306. FIG. 4 shows a floorplan of a residence 400 including various rooms, different pieces of furniture, appliances, fixtures, light sources, windows, and more. An electronic device 100 can be located in the residence 400, and a sensor (e.g., sensor device 106) can be used to detect information about the area, room, or zone within the residence 400 where the device is positioned. For instance, the residence 400 includes a kitchen 402, a living room 404, a bedroom 406, a closet 408, a bathroom 410, an entryway 412, and a balcony 414. Various pieces of furniture (e.g., a couch, bed, table, chairs, etc.), appliances (e.g., refrigerator, stove, television, Wi-Fi router, dresser, etc.), fixtures (windows, flooring, doors, sinks, lights, counters, toilet, bathtub, etc.), and other items can be positioned throughout the residence 400.

An electronic device 100 of the present disclosure can use its sensor(s) and communications device(s) to infer or measure characteristics about the context of the area in which it is located. In an example embodiment, the electronic device 100 can have cameras capable of viewing the area surrounding the device (e.g., recording images/video footage), microphones capable of recording sounds in the area surrounding the device, light & motion sensors (e.g., an infrared emitter/receiver, radar, LiDAR, light projector, etc.) capable of detecting objects and structures around the device, networking devices (e.g., an antenna/modem for Wi-Fi, BLUETOOTH®, cellular network, or similar connectivity) for detecting other network-connected devices nearby (e.g., other devices connected to the same Wi-Fi (or other) network) or detecting network connection sources (e.g., detecting that a Wi-Fi router is nearby, even if the electronic device 100 is not connected the network of that router), other sensors (e.g., a GPS receiver, accelerometer, smoke or other chemical detector, metal detector, magnetic field sensor, electric field sensor, temperature sensor/thermocouple), similar devices, and combinations thereof. Thus, determining the location of the electronic device 100 can include receiving signals from these sensors and determining the location and/or characteristics of the location of the electronic device 100 based on the signals.

In an example embodiment, an electronic device 416 can sense the presence of nearby elements or objects in the living room 404 such as by identifying objects in the local environment including a couch, a coffee table, television, and window using a camera, and a computer vision algorithm can be applied to the images obtained by the camera to determine objects' identities and to determine the context of the environment based on the object identities. For example, the system can detect that the room appears to be a living room by comparing a collected image to other images of living rooms due to similar identified objects being in the various images. Similarly, the device 416 can obtain images or sounds of activities being performed in the room 404 (e.g., something is moving nearby), can identify those activities (e.g., it is a person doing jumping jacks), and can determine that those identified activities are ones that would be indicative of using a living room (e.g., the person is exercising, so the electronic device must be in the vicinity of a living room or gym room). As used herein, a "local environment" is an environment near the electronic device or in which the device is located, such as a surrounding zone, area, room, building, and so on.

The electronic device 416 can detect that it is mounted vertically (i.e., with its rear surface on a wall, as would be the case when used in a wall mount that is associated with use in a living room area) to further improve confidence that the area is a living room. The electronic device 416 can detect a number of objects or persons in the area and can associate that number with a function of the room to further improve confidence of its location (e.g., more persons can be associated with a more public area like a living room). The device 416 can detect and identify a specific person (e.g., using a computer vision/image recognition algorithm) to determine the nature of a room, such as by identifying whether the person is a resident of the residence 400 or not. The device 416 can detect another electronic device (e.g., a local Wi-Fi network or a user's computing device/smartphone) in the area and can determine a certain capability or identifying feature of that device (e.g., that it has Wi-Fi connectivity or has a certain media access control (MAC) address) to determine that it is in that user's residence, such as by detecting both the user's Wi-Fi network and smartphone to determine that the router, smartphone, and electronic device are at that user's home (rather than just detecting that user at another location), and the device 416 can therefore be configured to present content data with a content delivery category associated with higher privacy or urgency for that user. In some embodiments, the content delivery category can be based on a user input, wherein the user identifies a privacy level or content delivery preference for the electronic device. Additionally, the content delivery category for content data at a certain electronic device can be dependent upon the time, date, or season of the location of the device. The time, date, or season can be input or can be obtained by the electronic device by querying other connected electronic devices, by measuring lights or sounds, by capturing images of a timekeeping device, and so on.

In another example, an electronic device 418 can sense the presence of nearby elements in a bedroom (e.g., 406), such as a bed, dresser, nightstand, window, door, closet (e.g., 408), and other furniture and structures. Thus, the context of the electronic device 418 and a category for its location can be determined based on the identities or numbers of certain objects sensed near in the local environment of the device, wherein the objects are correlated with certain types or categories of environments (e.g., beds are generally in bedrooms, desks are generally in offices, toilets are generally in bathrooms, and so on). The device 418 can also detect activities, persons, or other devices in its vicinity that suggest that it is in a bedroom. For example, certain individuals may be expected to be in the vicinity of the device 418, such as residents of the residence 400, but other individuals may not be expected, so the content delivery category of the types of information prioritized or presented by the electronic device 418 in that location can be changed upon detecting a non-resident. Similarly, the category or perceived context of the electronic device can be modified based on identifying a person, wherein a device can determine it is in a child's room after identifying the child a sufficient number of times or at certain times of day (e.g., when the child is going to sleep in the room).

Figure 5:
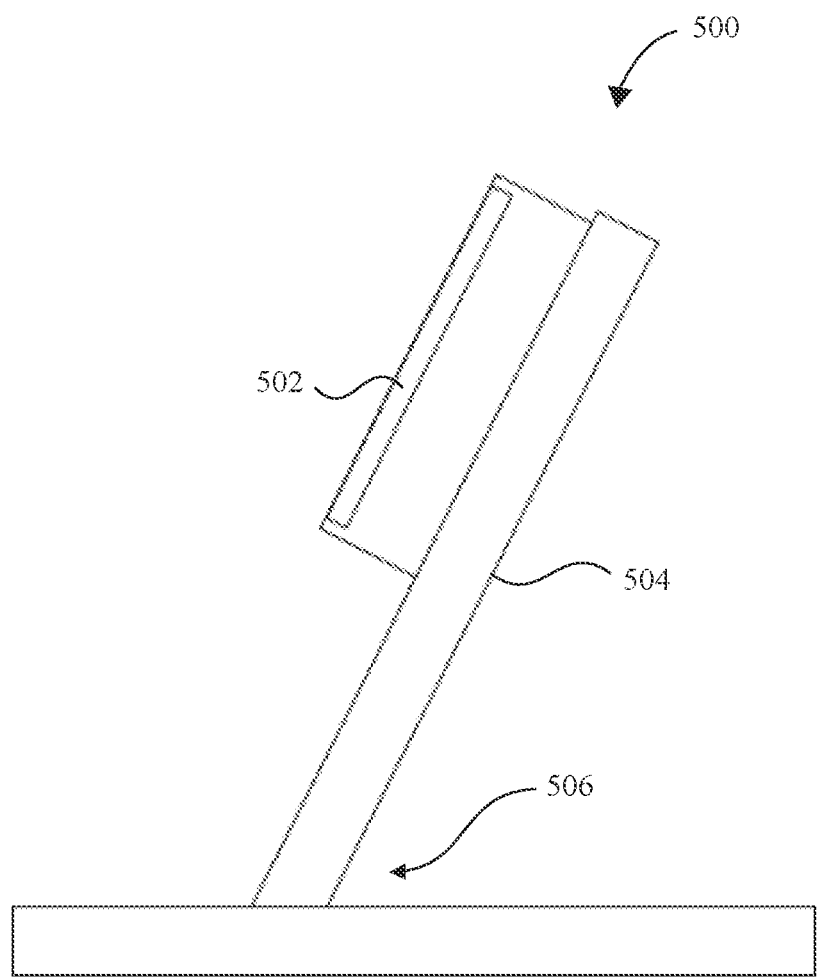
FIG. 5 illustrates a schematic side view of an electronic device mounted to a stand.

In some embodiments, the orientation of the device 418 can be used to associate the device with a bedroom location, such as by the device 418 being mounted in a tilted orientation. For instance, FIG. 5 shows a side view of an electronic device system 500 that can be positioned on a support surface such as a dresser, shelf, or table. The system 500 can have an electronic device 502 (e.g., an electronic device 100, 418 or mountable visual display 200) mounted to a stand 504 having an upper end or projection that supports the device 502 at a tilted angle 506. An accelerometer, gyroscope, or other spatial positioning sensor of the device 502 can be used to detect that it is being held stationary at a non-vertical and non-horizontal angle and that, based on the angle, the device 502 is being held by the stand 504. The stand 504 can be associated with use in a bedroom (e.g., the stand 504 is typically used on a dresser or nightstand), so detection of the tilt angle 506 can indicate to the device 502 that it is located in a bedroom. In some embodiments, the tilt angle 506 can indicate that it is located in another area, such as a kitchen or desk, based on the settings of the device 502 and stand 504. Accordingly, the stand 504 may be adjustable to different tilt angles 506 corresponding to different usage locations, and the device 502 can be configured to determine the device 502 location as it relates to those different tilt angles. Additionally, certain tilt angles can be assigned to different stands so that the electronic device 502 can quickly determine the context in which it is being used based on the angle of the stand to which it is mounted.

Additionally, in some configurations, the device 502 can detect the stand 504 and its mounting to the stand 504 using a radio frequency identification (RFID) sensor, by a quick response (QR) code, by detecting a material (e.g., metal) in the stand's support arm, or by similar methods. Thus, the device 502 can determine its mounting on a stand 504 using sensors other than a tilt or position sensor. As explained above, once the device 502 determines that it is mounted to the stand 504, the location of the device can be inferred based on the type of stand, the properties of the stand, device settings while attached to the stand, and so on.

Referring again to FIG. 4, upon detecting that the device 418 is in a bedroom, the content delivery category of the device 418 and the way that content data is delivered can be adjusted, such as, for example, by delivering content more quietly, not delivering content during certain times of day/night, delivering private information with higher or lower visibility or priority, providing information relevant to activities performed in that room (e.g., providing daily meeting reminders to help the user make the best choices in their manner of dress from the closet 408 or providing sleep statistics to the user in the morning), prioritizing wake alarms more prominently than other devices (e.g., 416), and so on.

Other devices 420, 422, 424 can also detect characteristics of their locations to determine their positioning and how content should be provided or prioritized from their output devices. A device 424 in a bathroom 410 can determine its location based on sensing a mirror, running water, an echo sound, usage of a suction cup, sensing images of objects or light patterns typically found in a bathroom, and so on. A device 420 in a hallway or entryway can determine its location based on sensing motion, doors, shoes, lock sounds, a lack of windows, and so on. A device 422 in a kitchen can determine its location based on sensing appliances, running water, and other kitchen-specific objects and activities. Content data delivered by an entryway device 420 can prioritize content relevant to persons coming and going from the residence 400 (e.g., a grocery list reminder, library book reminder, road traffic alerts, outside temperature or weather conditions, etc.) and can deprioritize or hide private information. The inverse can be provided by a device 424 in a bathroom, where private information is more prioritized than traffic alerts or other information related to being outside the residence 400. A device 422 in a kitchen can prioritize diet information, a grocery list, a cooking or oven timer, controls or information for smart appliances, water utility usage, and so on.

Accordingly, the location of a device within a residence 400 can be determined using many methods, sensors, and devices, and determining the location and its context can inform how the content delivery categories and content delivery settings are determined.

Figure 6:
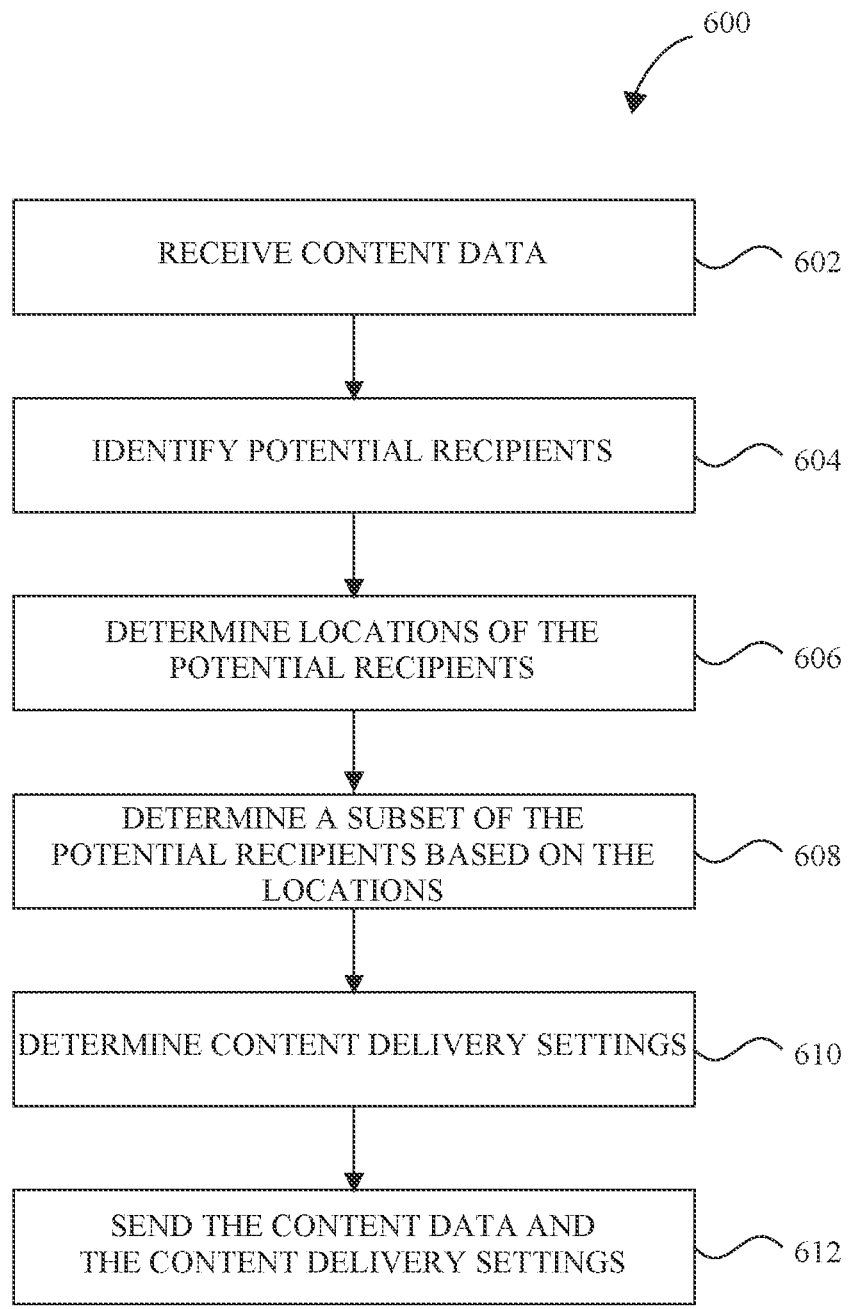
FIG. 6 illustrates a process flowchart of a method of distributing content to electronic devices.
Figure 7:
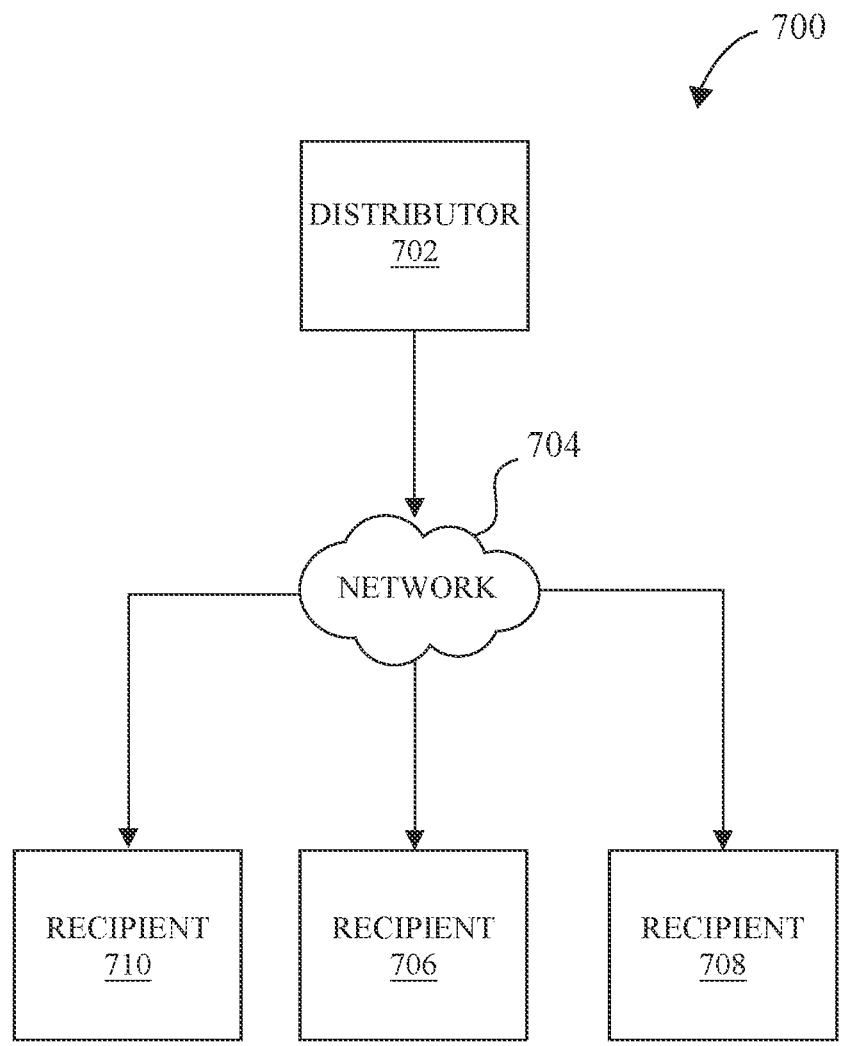
FIG. 7 illustrates a distribution network for distributing content to electronic devices.

FIG. 6 illustrates another aspect of the disclosure related to a process 600 for distributing content to electronic devices such as electronic device 100, mountable visual display 200, electronic devices 416, 418, 420, 422, 424, and other devices described herein. In block 602, the process 600 incudes receiving content data. This block 602 can be performed by a computing device from which the content data is created or distributed. For instance, as shown in FIG. 7, a computing device that is the origin of a piece of content data (e.g., a text message) can be designated as a distributor device 702, and receiving the content data in block 602 can therefore include creating the content data or receiving a notification or instruction to distribute the content data to other devices. The content data can be content data described above, such as, for example, in connection with block 302.

In block 604, the process 600 includes identifying multiple potential recipients of the content data. The recipients can be recipient devices (e.g., electronic devices 706, 708, 710), recipient users or individuals (e.g., owners or operators of the devices 706, 708, 710), groups of devices associated with certain locations (e.g., all devices within a university building) or certain interest groups (e.g., all enrolled members of a class in the school), similar devices and entities, and combinations thereof. The distributor device 702 can be connected to a distribution network 704 used to provide content data to other devices 706, 708, 710. The network 704 can include an electronic communications network such as a local area network (LAN), wide area network (WAN), the Internet, a peer-to-peer network, a mesh network, a cellular network, and other similar networks. The other devices 706, 708, 710 can include embodiments of the electronic device 100, mountable visual display 200, electronic devices 416, 418, 420, 422, and 424, and other devices described herein.

Identifying multiple potential recipients of the content data can include identifying the network 704 and identifying one or more recipients 706, 708, 710 connected to the network 704 and capable of receiving the content data. In some embodiments, recipients of the content data can be identified based on device capabilities and characteristics of the recipients 706, 708, 710, such as by identifying all recipients 706, 708, 710 that have devices with a visual display (e.g., for displaying image or text content data) or devices with an audio output device (e.g., for providing audible content data). The device capabilities and characteristics can therefore be determined based on physical structures and electronic components of the recipients 706, 708, 710. In some configurations, the device capabilities and characteristics can be determined based on software settings of the recipients 706, 708, 710, such as their software versions, user settings, available memory storage capacity, battery status, and so on.

Additionally, identifying multiple potential recipients can include identifying recipients 706, 708, 710 based on user accounts and information associated with the owners or operators of the recipient devices. User accounts can be identified as potential recipients of the content data based on the owners or operators being enrolled in a membership, club, team, church, school, or other similar organization. For example, the enrollment status of various recipients 706, 708, 710 in a qualifying organization can be stored in a database connected to the network 704, and the distributor 702 can therefore connect to the network 704 to determine which recipients 706, 708, 710 are members or otherwise associated with a particular organization. Similarly, user accounts can be identified as subscribers to a service or program (e.g., a news service). User accounts can also be identified based on characteristics of the users themselves, such as their age, family status, employment, interests, and so on. Thus, potential recipients can be identified based on features and characteristics of the recipient devices and based on features and characteristics of associated users and their interests and activities.

In block 606, the process 600 can include determining locations of the multiple potential recipients. As discussed in connection with block 304, the locations of the devices can be determined using their sensors, geographic positioning, relative positioning, and similar techniques, and those techniques discussed in connection with block 304 can be used to determine locations in block 606. The individual recipients 706, 708, 710 can report their locations to the distributor 702 via the network 704 or can report their locations to a database on the network 704 that is accessible by the distributor 702. Thus, the distributor 702 can have information on the context—i.e., location status and/or location characteristics (e.g., privacy level of each location, types of activities performed at each location, etc.) of each of the recipients 706, 708, 710.

In block 608, the process 600 can include determining a subset of the multiple potential recipients based on the locations. In this manner, the process 600 can include classifying the recipients 706, 708, 710 into groups and then selecting one of the groups as the subset of the recipients. The subset of recipients can be selected based on a region or zone that the recipients have in common, such as a political or geographical region or zone.

Figure 8:
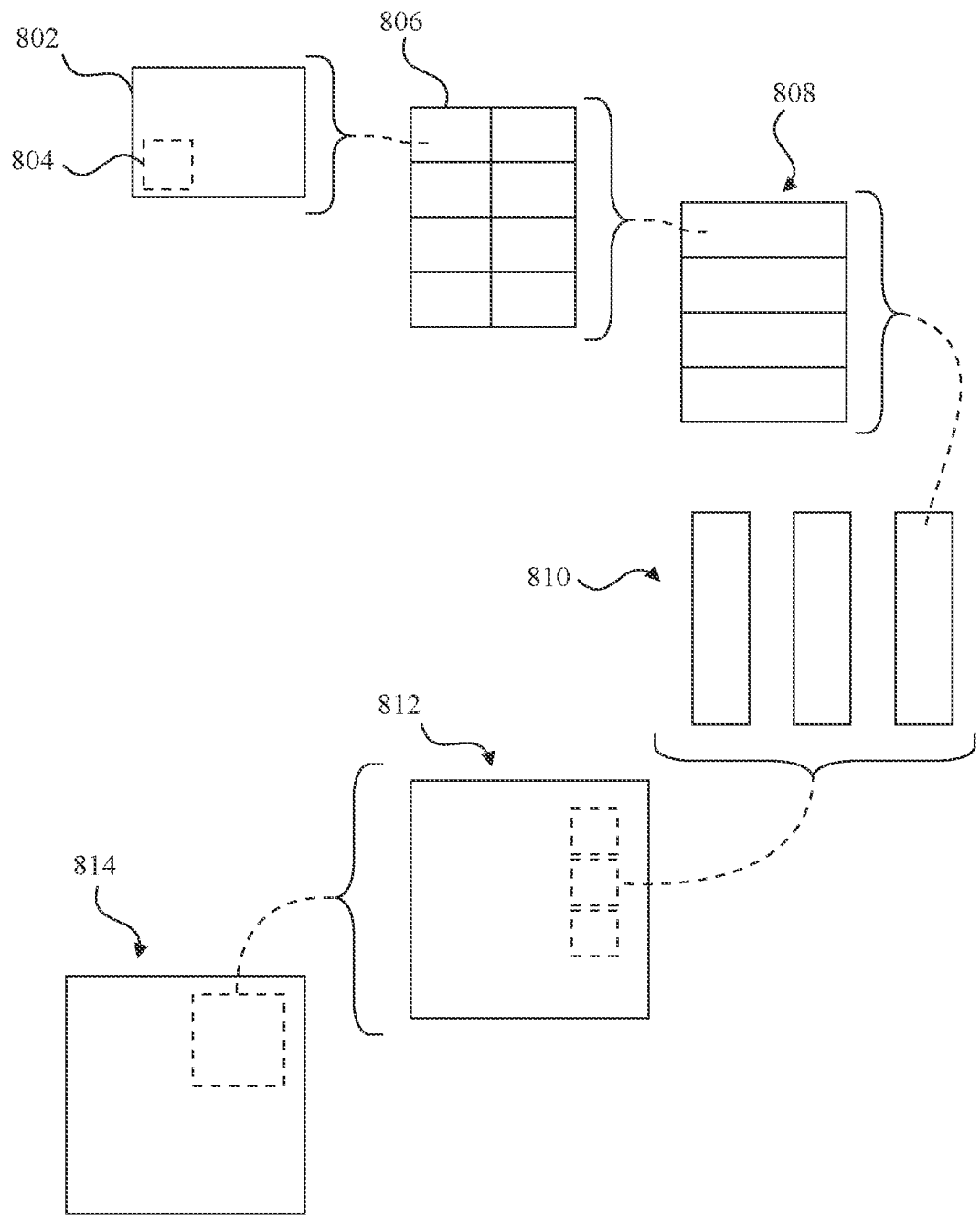
FIG. 8 illustrates a series of different zones or areas which can be identified and targeted as part of a method for distributing content to electronic devices.

For example, FIG. 8 shows various types of regions and zones that can be used in connection with determining the subset of block 608. For example, a residence 802 can include a variety of different zones or rooms (e.g., room 804), a building level or floor 806 can include a variety of residences 802, a building 808 can include a variety of floors 806, a community 810 can include a variety of buildings 808, a city 812 can include a variety of communities 810 or other subsectors, a state 814 can include a variety of cities or counties, and so on.

Thus, when determining a subset of the multiple potential recipients, the process 600 can include determining which type of region or zone to isolate or identify (e.g., all kitchens), and then to determine which potential recipient electronic devices are within the region(s) or zone(s) (e.g., devices determined to be located in kitchens via their sensors or user input settings identifying their positions). For example, the process 600 can include determining a subset of potential recipients that are located in a state 814, city 812, or community 810 and identifying that subset of potential recipients instead of another set or subset of potential recipients located in another state, city, or community.

Additionally, multiple types of regions and zones can be used to determine the subset of potential recipients. For example, a subset can be based on identifying devices that are within a city 812, that are also within a certain type of room 804 (e.g., kitchens or hallways), and that are also in a certain type of building 808 (e.g., apartment complexes, office buildings). In this manner, the distributor 702 can have fine control over the range of locations receiving the content data which devices are targeted and added to the subset of potential recipients.

In some arrangements, the subset of potential recipients of block 608 can be determined at least in part based on user profiles or user characteristics associated with the locations in which the electronic devices are positioned. Thus, targeted groups of recipients and recipient devices can be identified for delivery of the content data received in connection with block 602. The user profiles can include preferences or settings provided by the user and associated with the location, such as settings delineating "do not disturb" times while a device is positioned in a certain room (e.g., while in the bedroom) or other location (e.g., while the device is away from home). Thus, in that example, the subset of potential recipients can include a group of devices that are simultaneously within a certain distance range from a location (e.g., within a building (e.g., 808) less than four miles from a venue for an upcoming concert) and that are not muted, below a certain battery state of charge percentage, or are owned by users with a certain musical preference (e.g., have a record of having recently listened to a song by the band performing at the concert). Thus, the subset of potential recipients can be determined with precision based on location, coordinates, user preferences, device usage records, user information, and other data associated with each electronic device connected to the network 704.

In block 610, the process 600 can include determining content delivery settings for the content data. Content delivery settings can at least partially include assigned content delivery categories for the content data, as described in connection with block 306. The content delivery settings can include instructions to the recipient devices and setting indicators associated with the presentation and delivery of the content data by the recipient electronic devices that are identified as part of the subset of the potential recipients in block 608. These content delivery settings can include information about priority of the content data (i.e., how urgently the information should be shown relative to other content data), the manner in which it should be output (e.g., visually, audibly, or both), associated output settings (e.g., volume, brightness, color, font, opacity, playback speed, etc.), and the context or time and place it should be delivered (e.g., after a predetermined delay, after receiving a user input, at a certain time of day, when the device is moved to a certain place, when the setting of the device changes from a public setting to a private setting (or vice versa), and so on).

Content delivery settings can also include a predetermined priority setting or recommended priority setting for the recipient electronic devices to implement, such as by categorizing the content data as being in a first tier of urgency or priority for a first type of user or location and being in a second, lower tier of urgency or priority for a second type of user or location. For example, certain content data can be presented with higher priority for younger recipients as compared to older recipients, or content data can be presented at higher priority for devices of the subset of potential recipients that are in commercial offices as compared to devices of the subset that are in homes, other identified places, or unidentified places.

The process 600 therefore receives the content data, identifies a subset of recipients in certain locations, assigns content delivery settings for that content data, and, in block 612, sends the content data and the content delivery settings to the subset of the multiple potential recipients. The action of sending the content data can be performed using the methods and techniques described above in connection with block 308. The content data can be transmitted to the recipient electronic devices 706, 708, 710 and then delivered according to the content delivery settings as executed by the recipient electronic devices.

Alternatively, the content data can be transmitted to the recipient electronic devices according to content delivery settings administered by the device of the distributor 702, such as by a delay or schedule implemented by the distributor 702. Then, after the content data is delivered from the distributor 702, the recipients 706, 708, 710 can immediately deliver the content data. In another example, the content data can be delivered from the distributor 702 with additional content delivery settings to be implemented by the recipients 706, 708, 710 after a first set of content delivery settings have been implemented by the distributor 702. Thus, the determined content delivery settings of block 610 can include a first set of content delivery settings for a distributor of the content data and a second set of content delivery settings for a recipient of the content data.

Another aspect of the disclosure relates to the usage of multiple electronic devices 900 (e.g., electronic device 100, mountable visual display 200, electronic devices 416, 418, 420, 422, 424, and other devices described herein) to display content data based on the positional context of the devices 900 relative to each other. In other words, a method is provided for displaying content data across multiple electronic devices. Multiple electronic devices 902, 904 can be configured to output separate pieces of content data while in a first positional orientation and at a first distance 910 from each other. As shown schematically in FIG. 9, devices 902, 904 can be configured to separately and independently display information (i.e., the time on a clock face) as content data 906 and content data 908 while the devices 902, 904 are positioned at a first distance 910 apart from each other. One or both pieces of content data 906, 908 can be referred to as a first set of content data being displayed. The devices 902, 904 can detect their positions relative to each other (or at least estimate their distance 910 apart from each other) using various methods, including, for example, using radar, LiDAR, ultra wideband wireless signals, ultrasonics, acceleration/motion sensing, electric field or capacitance sensing, magnetic field sensing, detecting a lack of contact (e.g., a lack of conduction between parts of each of the devices 902, 904), and so on. While the devices 902, 904 remain apart, they can independently present content data 906, 908 without interacting or interfering with each other.

Figure 10:
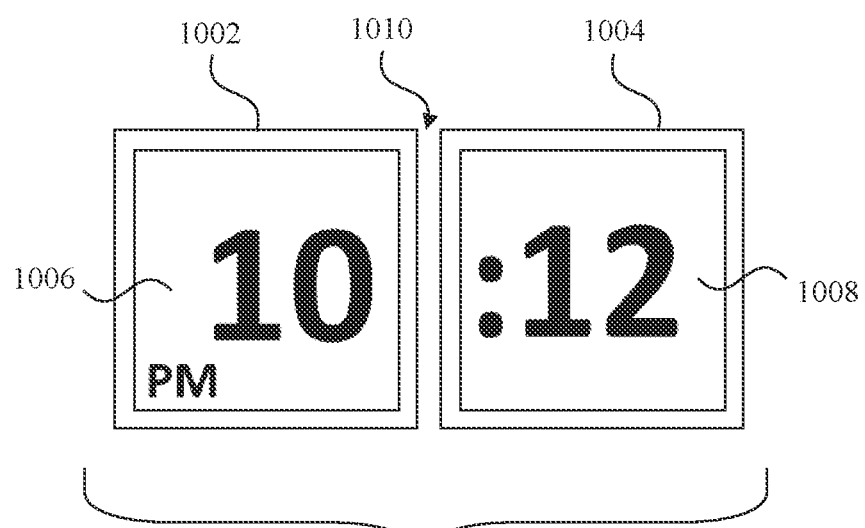
FIG. 10 illustrates a pair of electronic devices adjacent to each other and displaying content data based on their relative positioning.

FIG. 10 shows that in another situation, devices 1002, 1004 can be brought into proximity with each other (e.g., at short distance 1010), and that proximity or distance relative to each other can be used to modify the set(s) of content data 1006, 1008 being displayed by one or both devices 1002, 1004. Thus, when the devices 1002, 1004 are brought into proximity, the content data 906, 908 can be converted into a different kind, category, or size of content data (including 1006 and 1008) that collectively conveys a visually extended, enlarged, or expanded piece of content data represented by both devices 1002, 1004.

Figure 9:
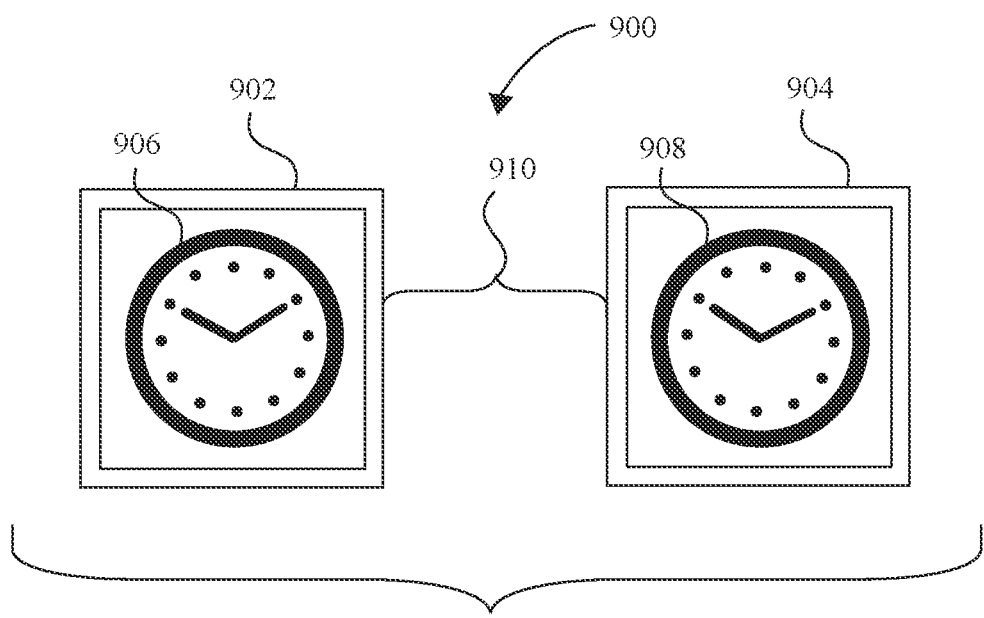
FIG. 9 illustrates a pair of electronic devices spaced apart from each other and displaying independent content data.

The proximity of the devices 1002, 1004 can be detected using the same or different sensors as the sensors used to detect that they are apart in the configuration of FIG. 9. For instance, radar, LiDAR, ultra wideband, ultrasonics, electric field or capacitance sensing, magnetic field sensing, acceleration sensing, or detecting contact/conductance of a signal between the devices 1002, 1004 can be used to determine that the devices are within a threshold minimum distance 1010 of each other, and the output appearance (or sound or other type of output) can convert to a different setting. In some embodiments, the threshold minimum distance 1010 is substantially zero, such as in the case where contact/conductance between two parts of the devices 1002, 1004 is required. In some embodiments, at least one device 1002 emits an electric or magnetic field, and at least one other device (e.g., 1004) can, by use of a sensor, detect the strength or direction of the field and can thereby determine the distance and/or orientation of the first device 1002 relative to the second device.

Furthermore, the distance between the devices 902, 904, 1002, 1004 can be determined without contact by using wireless ranging and distance measurement techniques known in the art such as, for example, radar imaging, radar frequency modulation, time-of-transmission, time-of-flight, or time-of-arrival measurement, Doppler processing, similar techniques, and combinations thereof. Relative orientation of devices 902/904 or 1002, 1004 can be determined using device contact (e.g., detecting that a first contactor on a known side of a device 902 is in contact with a second contactor on a known side of another device 904), ultrasonics, radar, LiDAR, ultra wideband, position or angle accelerometer(s), gyroscopes/gravitational directional measurements, similar techniques, and combinations thereof.

In some embodiments, the displayed content of a first device is only changed when brought into proximity of a second device when the second device is also in a predetermined orientation relative to the first device. Furthermore, content of the first device can be changed when brought into proximity of a second device having a first orientation relative to the first device and then changed again as the orientation of the second device is changed to a second orientation relative to the first device. For instance, an arrow displayed by the first device can move on the first device's display to point at the second device as the relative orientation of the devices changes over time. In another example, the first device can transmit a signal to the second device based on their relative orientation, and the signal can instruct or inform the second device to display additional visual content that includes an extension of what is displayed by the first device (or other related information).

In an example embodiment, a first set of content data 906 (i.e., the time) is presented by an electronic device 902/1002. Then, when a second electronic device 1004 is detected as being in a predetermined position, distance, or orientation relative to the first device 902/1002 (e.g., within distance 1010), the first set of content data 906 is replaced by a second set of content data 1006 which partially shows the same content data as the first set of content data (i.e., it shows part of the time, such as the current hour), and a third set of content data 1008 is displayed using the second electronic device 1004 (i.e., it shows another part of the time displayed by first device 902/1002, such as the corresponding current minute of the hour). The devices 1002/1004 can show the second and third sets of content data in a manner corresponding to the positioning and orientation of each device. As shown in FIG. 10, the content data 1006, 1008 is shown in a manner that is readable left-to-right if the devices 1002, 1004 are positioned adjacent to each other with a right side of device 1002 adjacent to the left side of device 1004 (with left and right defined as viewed from the front, as shown in FIG. 10). For this reason, the sets of content data 1006, 1008 have the appearance of being displayed continuously or as an "apparent single set" of content data shared and delivered by both devices 1002, 1004 as if they were one device or as if they shared a single display.

Figure 11:
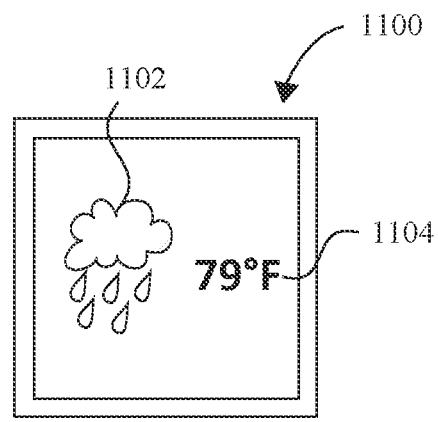
FIG. 11 illustrates an electronic device providing a set of content data.
Figure 12:
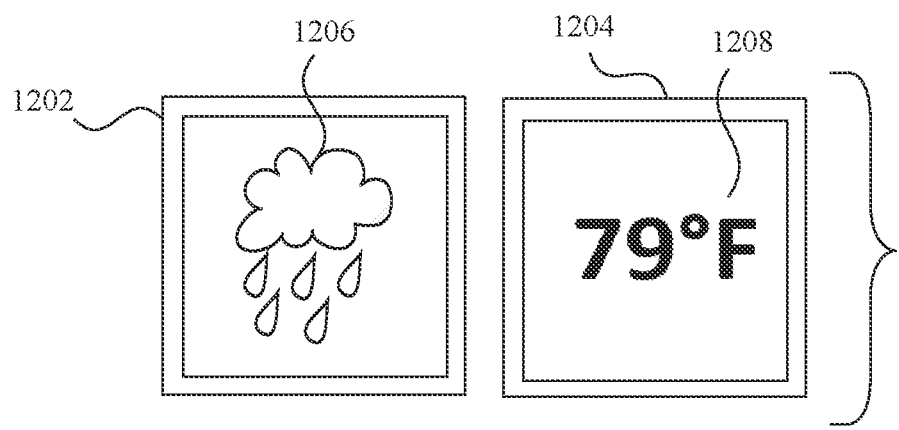
FIG. 12 illustrates a pair of electronic devices adjacent to each other and displaying content data based on their relative positioning.
Figure 13:
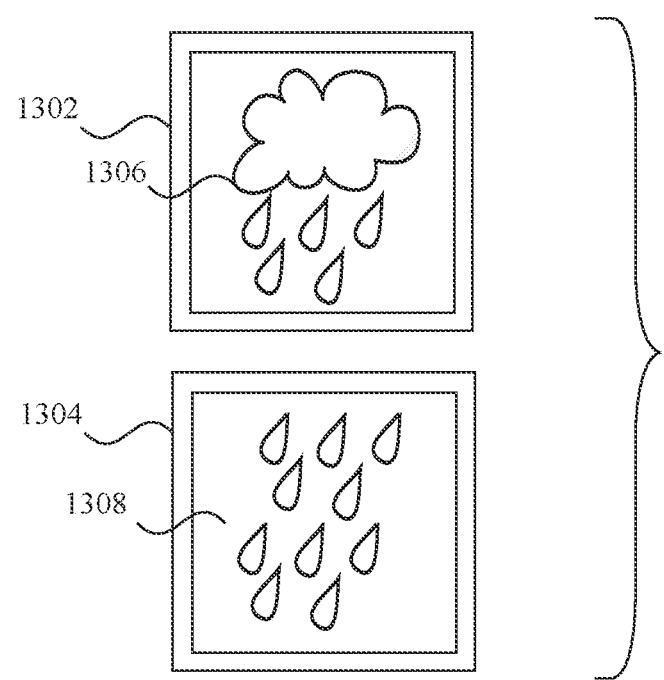
FIG. 13 illustrates a pair of electronic devices adjacent to each other in a different manner as compared to FIG. 12 and displaying content data based on their relative positioning.

FIGS. 11-13 depict another example embodiment illustrating similar features. In FIG. 11, a single device 1100 is configured to provide a first set of content data including two (or more) pieces of content data 1102, 1104, which, in this case, include a weather condition (i.e., a rainy cloud symbol) and a temperature condition (i.e., 79 degrees Fahrenheit). The size of the device 1100 can make presentation of multiple pieces of content data 1102, 1104 difficult to read and understand, particularly when viewed from a long distance. Accordingly, the content data can be made easier to consume when another device is brought into the vicinity of the first device 1100.

As shown in FIG. 12, a first device 1202, when in the vicinity of a second device 1204, can have its presentation of content data simplified, enlarged by, expanded across, or split between the first and second devices 1202, 1204. Thus, the two pieces of content data 1206, 1208 are shown distinctly by each device 1202, 1204. Each of the two pieces of content data 1206, 1208 provide the same information conveyed as the content data 1102, 1104 of FIG. 11, but the content data 1206, 1208 is now enlarged and easier to read. By comparison, the content data 906 of FIG. 9 is not shown in the same manner when it is shown as content data 1006, 1008 since it is converted from an analog clock image showing the time to a set of digits showing the digital time and also showing the a.m./p.m. designation of the time. Thus, the subject matter of the content data 906 is substantially equivalent to the expanded content data 1006, 1008 but is shown using a different visual convention. The subject matter of content data 906 is visually extended across content data 1006, 1008. The content data 1102, 1104 is the same as or equal to the content data 1206, 1208 and is shown only at a different scale and spacing. The subject matter of content data 1102, 1104 is also visually extended across content data 1206, 1208.

Content data can also be equivalent in two different states as shown in FIGS. 12-13. In a first state, shown in FIG. 12, content data 1206 can be shown on one device 1202 with a first appearance (i.e., a raining cloud image). If the device 1202 is brought into proximity of another device (e.g., device 1202 takes the place of device 1302 relative to 1304), the content data 1206 can be shown on device 1202 similar to content data 1306 (i.e., still showing a raining cloud image, as shown in FIG. 13). Content data 1308 can also be updated and shown on the second device 1304. The content data on device 1202 can, however, be in a second state that is equivalent to the content data of the first state, such as conveying the same subject matter, but at a different scale or position on the display. Thus, a first set of content data 1206 can be displayed by a first device 1202, and a second set of content data 1306 can be provided that is equivalent to the subject matter of first set of content data when the device 1202 is in a second state (i.e., in the position of device 1302 relative to device 1304).

FIG. 13 shows another type of interaction between a first device 1302 and a second device 1304, wherein approximation of the first device 1302 with the second device 1304 in a different relative position causes a different interaction between the devices and a different display of content data on those devices. In FIG. 12, the devices 1202, 1204 are positioned in a left-right lateral alignment, and the content data 1206, 1208 splits into two parts (as compared to FIG. 11) and is displayed in a left-right split by the two different devices 1202, 1204. In FIG. 13, the devices 1302, 1304 are positioned in a top-bottom lateral alignment (wherein "lateral" is defined as a direction extending parallel to the sheet of FIGS. 12 and 13), and the content data 1306, 1308 represents a top-and-bottom-aligned lateral extension of a portion of the content data previously presented (e.g., 1102). Thus, positioning the electronic devices in a first position and orientation relative to each other (i.e., the position of FIG. 11, where one device 1100 is isolated from another one) causes the electronic devices to produce content data subject matter in a first manner (i.e., as shown in 1102, 1104 on the same device 1100), positioning the devices in a second position and orientation relative to each other (i.e., the position of FIG. 12, where one device 1202 is to the left of another device 1204) causes the electronic devices to produce content data subject matter in a second manner (i.e., as shown in 1206, 1208 on two different devices), and positioning the devices in a third position and orientation relative to each other (i.e., the position of FIG. 13, where one device 1302 is above another device 1304) causes the electronic devices to produce content data subject matter in a third manner (i.e., as shown in 1306, 1308 on two different devices). The content data 1308 of device 1304 is a visual extension of the content data 1306 of the other device 1302. Content referred to as being a "visual extension" of other content data is content that is a continuation of the data across multiple devices, i.e., a single piece or category of visual content data (e.g., an icon image or series of icon images) that is provided in split-up parts across each of the devices.

FIGS. 11-13 also illustrate that the nature of the content data displayed can be controlled to change based on the number and positioning of the devices near each other. Weather conditions are shown in all three situations (i.e., FIGS. 11-13), but temperature conditions are only shown in two situations (i.e., FIGS. 11-12). A certain part of the subject matter in the content data is emphasized or exaggerated with the devices in a certain positioning (i.e., FIG. 13), where the content data 1306, 1308 is enlarged and extends across both devices. In some embodiments, content data 1306 provided by one device 1302 can be configured to appear to animate from one display to the display of the other device 1304, such as by the raindrops of content 1306 appearing to "fall" downward and appear to continue to "fall" downward from the top of the display of device 1304 as part of content data 1308. Similarly, content data can be animated or "move" across one or more devices horizontally (e.g., between 1202 and 1204) or in a combination of horizontal and vertical movement across the displays.

In some embodiments, the appearance of content data on one display can be moved to another display in response to a user input. For example, the content data 1102, 1104 shown on device 1100 can remain as shown in FIG. 11, even when brought into the position of device 1202 relative to device 1204. In other words, manual input may be required to cause the content data 1102, 1104 to change its appearance. The user input can include a touch or gesture (e.g., swipe, pinch, etc.) on a touchscreen input device of the device 1100/1202, and the sensed touch or gesture can trigger a change in the display of the content data 1102, 1104, such as by changing the data to the display of content data 1206 and 1208 in FIG. 12. In some embodiments, the content data can be animated to "move" or appear to move across the display of one or both devices 1202, 1204. Thus, a user can provide a swiping gesture to device 1100 to cause content data (e.g., 1104) to move and to appear on a nearby device (e.g., to appear as content data 1208 on device 1204).

Figure 14:
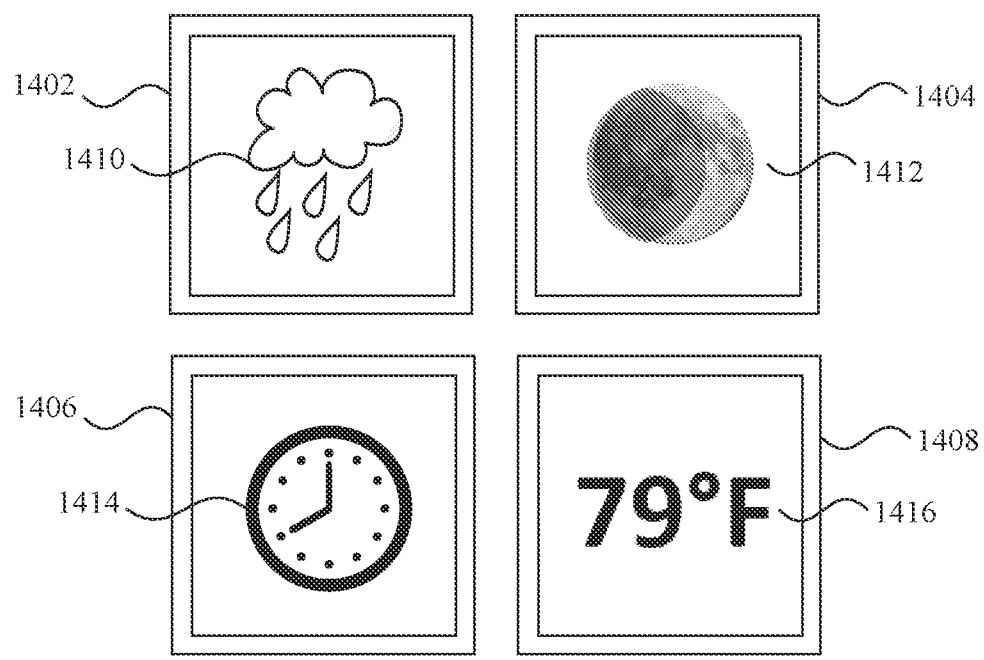
FIG. 14 illustrates multiple electronic devices displaying content data based on their relative positioning.

FIG. 14 shows that when more than two electronic devices 1402, 1404, 1406, 1408 are brought into proximity with each other, the devices can provide content data 1410, 1412, 1414, 1416 in a manner dependent upon the devices and their relative positioning. In other words, each of the devices 1402, 1404, 1406, 1408 can display the same or different information when they are sufficiently spaced away from each other, such as by being in a position where they would not reasonably be viewed as being extensions of one another, but when they are brought together, such as in a two-by-two grid configuration shown in FIG. 14, the devices 1402, 1404, 1406, 1408 can have content data outputs that are dependent upon each other and that are reflective of the devices' context (i.e., their proximity and positioning).

In FIG. 14, the content data 1410, 1412, 1414, 1416 of each device 1402, 1404, 1406, 1408 provides a different type of information (i.e., weather conditions, moon conditions, time, and temperature conditions, respectively) because the detection of the devices 1402, 1404, 1406, 1408 being near each other causes the devices to eliminate or prevent redundancy in the content delivered. Thus, the devices 1402, 1404, 1406, 1408 can individually provide different content or combinations of the content data 1410, 1412, 1414, 1416 when the devices are apart from each other, but upon arranging the devices 1402, 1404, 1406, 1408 in the positioning shown in FIG. 14, the devices can provide content or combinations of the content data without repeating or replicating data shown on the other nearby devices.

Furthermore, although a two-by-two grid of four devices is shown in FIG. 14, it will be understood that a variety of different orientations, device numbers, and alignments can be implemented and can cause corresponding changes in the content data and delivery of that content data for the devices 1402, 1404, 1406, 1408. For example, the devices can be arranged in a horizontal or vertical straight lateral line to enable the content data 1410, 1412, 1414, 1416 to be shown by each device or to be shown differently (e.g., like the extended content data 1306, 1308). Four devices arranged in a square can cause the content data of one device to be split into four parts and displayed in quadrants by the four displays of the devices. Similarly, nine devices arranged in a three-by-three grid (or another arrangement in close proximity to each other) can display certain information in an enlarged or expanded state, can each display different pieces of information or the same information in different ways, or both.

Figure 15:
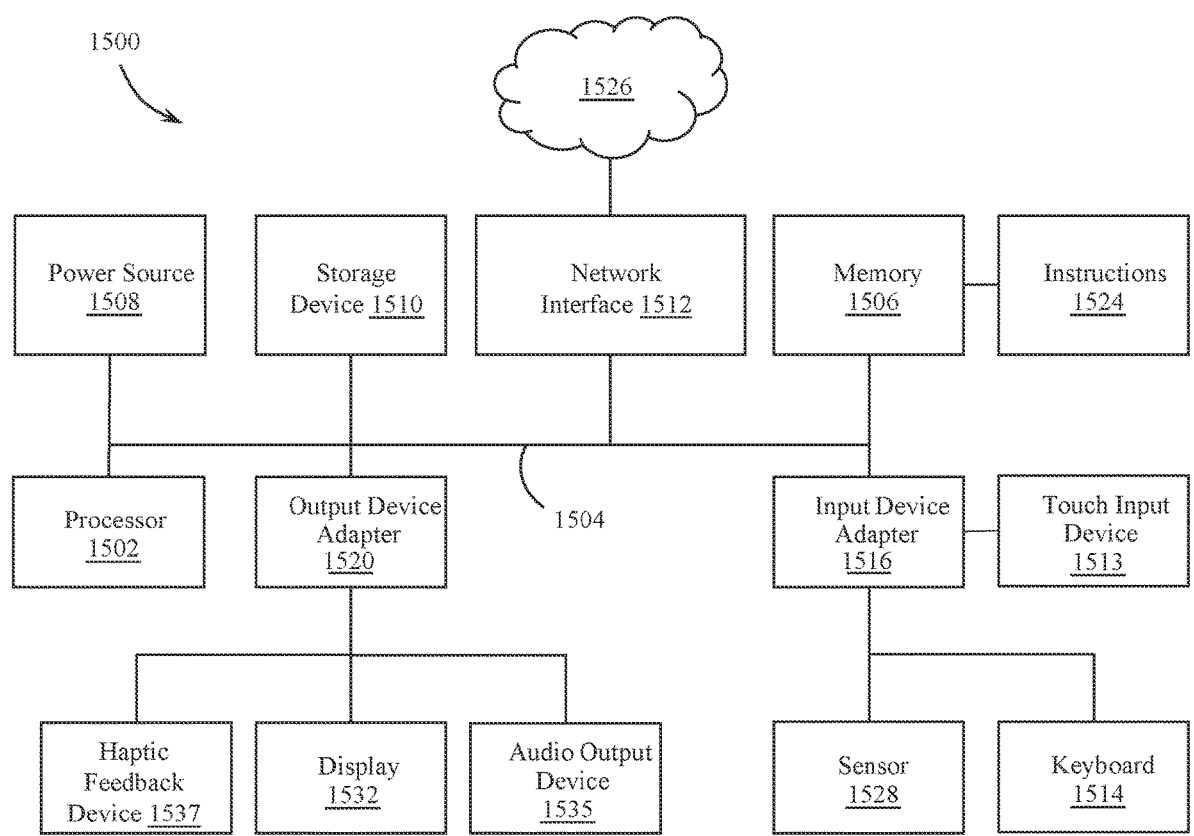
FIG. 15 shows a block diagram of a computer system 1500 for embodiments of the present disclosure.

FIG. 15 shows a high-level block diagram of a computer system 1500 for embodiments of the present disclosure. In various embodiments, the computer system 1500 can include various sets and subsets of the components shown in FIG. 15. Thus, FIG. 15 shows a variety of components that can be included in various combinations and subsets based on the operations and functions performed by the system 1500 in different embodiments. For example, the computer system 1500 can be implemented as electronic device 100 described above in connection with FIG. 1, mountable visual display 200, or other electronic devices described above. It is noted that, when described or recited herein, the use of the articles such as "a" or "an" is not considered to be limiting to only one, but instead is intended to mean one or more unless otherwise specifically noted herein.

The computer system 1500 can include a central processing unit (CPU) or processor 1502 connected via a bus 1504 for electrical communication to a memory device 1506, a power source 1508, an electronic storage device 1510, a network interface 1512, an input device adapter 1516, and an output device adapter 1520. For example, one or more of these components can be connected to each other via a substrate (e.g., a printed circuit board or other substrate) supporting the bus 1504 and other electrical connectors providing electrical communication between the components. The bus 1504 can include a communication mechanism for communicating information between parts of the system 1500.

The processor 1502 can be a microprocessor or similar device configured to receive and execute a set of instructions 1524 stored by the memory 1506 (e.g., electronic instructions 112 stored by memory device 110). The memory 1506 can be referred to as main memory, such as random access memory (RAM) or another dynamic electronic storage device for storing information and instructions to be executed by the processor 1502. The memory 1506 can also be used for storing temporary variables or other intermediate information during execution of instructions executed by the processor 1502. The storage device 1510 can include read-only memory (ROM) or another type of static storage device coupled to the bus 1504 for storing static or long-term (i.e., non-dynamic) information and instructions for the processor 1502. For example, the storage device 1510 can include a magnetic or optical disk (e.g., hard disk drive (HDD)), solid state memory (e.g., a solid state disk (SSD)), or a comparable device. The power source 1508 can include a power supply capable of providing power to the processor 1502 and other components connected to the bus 1504, such as a connection to an electrical utility grid or a battery system.

The instructions 1524 can include information for executing processes and methods using components of the system 1500. Such processes and methods can include, for example, the methods described in connection with FIGS. 3-14 for controlling the display and delivery of content data using an electronic device.

The network interface 1512 can include an adapter for connecting the system 1500 to an external device via a wired or wireless connection. For example, the network interface 1512 can provide a connection to a computer network 1526 (e.g., network 704) such as a cellular network, the Internet, a local area network (LAN), a separate device capable of wireless communication with the network interface 1512 (e.g., a recipient device 706, 708, 710 or distributor device 702), other external devices or network locations, and combinations thereof. In one example embodiment, the network interface 1512 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 1526 can be considered part of the system 1500. In some cases, a network device can be considered connected to, but not a part of, the system 1500.

The input device adapter 1516 can be configured to provide the system 1500 with connectivity to various input devices such as, for example, a touch input device 1513, a keyboard 1514, one or more sensors 1528 (e.g., capacitive sensors, accelerometers, and other sensors described herein), related devices, and combinations thereof. In an example embodiment, the sensors 1528 can include a camera device used to capture images to determine characteristics of a location of the system 1500. The keyboard 1514 or another input device (e.g., a touch screen/touch sensor, buttons, or switches) can be used to provide user input such as input regarding the settings of the system 1500 and user preferences.

The output device adapter 1520 can be configured to provide the system 1500 with the ability to output information to a user, such as by providing visual output using one or more displays 1532, by providing audible output using one or more speakers 1535, or providing haptic feedback sensed by touch via one or more haptic feedback devices

1537. Other output devices can also be used. The processor 1502 can be configured to control the output device adapter 1520 to provide information to a user via the output devices connected to the adapter 1520.

To the extent it is utilized by the present systems and methods, personal information data that is used to implement and improve on the various embodiments described herein, should be gathered pursuant to authorized and well established secure privacy policies and practices that are appropriate for the type of data collected. The disclosed technology is not, however, rendered inoperable in the absence of such personal information data.

It will be understood that the details of the present systems and methods above can be combined in various combinations and with alternative components, and that the foregoing descriptions and embodiments are presented for illustration and description. The scope of the present systems and methods will be further understood by the following claims.

What is claimed is:

1. A method of managing content delivery from an electronic device, the method comprising:
   receiving, at a processor of an electronic device, content data;
   receiving, at the processor, a signal from a camera of the electronic device;
   identifying, via the processor, objects near the electronic device based on the signal;
   identifying, via the processor, a location of the electronic device based on the objects identified near the electronic device;
   determining, via the processor, a content delivery category for the location; and
   in response to determining that the content data fits within the content delivery category, delivering the content data via the electronic device.

2. The method of claim 1, wherein the content delivery category is based on a privacy level of the location.

3. The method of claim 2, wherein the privacy level of the location is based on a user input.

4. The method of claim 2, wherein the privacy level of the location is based on an activity performed at the location.

5. The method of claim 2, wherein the privacy level of the location is based on a number of persons or other electronic devices at the location.

6. The method of claim 2, wherein the privacy level of the location is based on a capability of another electronic device detected at the location.

7. The method of claim 1, wherein the content delivery category is based on an activity performed at the location.

8. The method of claim 1, wherein:
   the content data comprises a first piece of content data and a second piece of content data; and
   the method further comprising:
   prioritizing the first piece of content data and the second piece of content data based on the location; and
   sequentially delivering, via the electronic device, the first piece of content data and the second piece of content data based on the prioritization.

9. The method of claim 1, wherein the content delivery category is based on a time, a date, or a season at the location.

10. A method of distributing content to an electronic device, the method comprising:
    receiving content data;
    identifying multiple potential recipient devices of the content data;
    determining locations of the multiple potential recipient devices based at least partially on objects detected by a camera of each respective potential recipient device;
    determining a subset of the multiple potential recipient devices based on the locations;
    determining content delivery settings for the content data; and
    sending the content data and the content delivery settings to the subset of the multiple potential recipient devices.

11. The method of claim 10, wherein the multiple potential recipient devices are identified based on enrollment of the multiple potential recipient devices in an organization.

12. The method of claim 10, wherein the multiple potential recipient devices are identified based on a time, a date, or a season.

13. The method of claim 10, wherein:
    determining locations of the multiple potential recipient devices includes determining a privacy characteristic of each location of the locations of the multiple potential recipient devices; and
    the subset of the multiple potential recipient devices is determined based on the privacy characteristic of each location.

14. The method of claim 10, wherein:
    determining locations of the multiple potential recipient devices includes determining an activity performed at each location of the locations of the multiple potential recipient devices; and
    the subset of the multiple potential recipient devices is determined based on the activity performed at each location.

15. The method of claim 10, wherein the content delivery settings include a delay for delivering the content data to the subset of the multiple potential recipient devices.

16. The method of claim 10, wherein the content delivery settings include delivering the content data in response to an interaction with an electronic device of the subset of the multiple potential recipient devices.

17. The method of claim 10, wherein the content delivery settings include immediately delivering the content data to the subset of the multiple potential recipient devices upon receipt of the content data by the subset of the multiple potential recipient devices.

18. A method of determining a context of an electronic device in a local environment, the method comprising:
    receiving a signal from a camera of a content delivery device, the signal indicating a presence of an object in a local environment surrounding the content delivery device;
    determining an identity characteristic of the object;
    determining a location of the local environment and a context of the local environment based on the identity characteristic; and
    providing a content delivery setting for the content delivery device based on the location and the context of the local environment; and
    delivering content via the content delivery device based on the content delivery setting.

19. The method of claim 18, wherein:
    the signal indicates a number of objects in the local environment; and
    the context of the local environment is determined based on the number of objects.

20. The method of claim 18, wherein:
    the signal includes electronic image data including at least a portion of the object; and determining the identity characteristic comprises identifying the object in the electronic image data.

21. The method of claim 18, wherein:
the object includes a person;
the identity characteristic includes an identity of the person; and
the context of the local environment includes a room category based on the person identified.

22. The method of claim 18, wherein determining an identity characteristic includes detecting an orientation of the content delivery device.

23. A method of displaying content on multiple electronic devices, the method comprising:
displaying a first set of content data using a first display of a first electronic device;
detecting, using a sensor of the first electronic device, a second electronic device, the sensor comprising a camera;
detecting, using the sensor, an object near the first electronic device;
determining a location of the first electronic device based on the detected object;
determining a position of the first electronic device relative to the second electronic device based on output of the sensor;
providing, via the first display of the first electronic device, a second set of content data based on the position of the first electronic device; and
providing, via a second display of the second electronic device, a third set of content data based on the position of the first electronic device.

24. The method of claim 23, wherein the second set of content data and the third set of content data include an enlarged portion of the first set of content data.

25. The method of claim 23, wherein the second set of content data comprises subject matter equivalent to subject matter of the first set of content data.

26. The method of claim 25, wherein the third set of content data is an extension of the second set of content data.

27. The method of claim 26, wherein the third set of content data is a visual extension of the second set of content data.

28. The method of claim 23, further comprising:
sensing a user input; and
moving content data displayed by the first display of the first electronic device to the second display of the second electronic device in response to the user input.

29. The method of claim 23, wherein detecting the second electronic device comprises detecting contact between the first electronic device and the second electronic device.

30. The method of claim 23, further comprising detecting an orientation of the first electronic device relative to the second electronic device.

31. An electronic device, comprising:
a first display;
a sensor comprising a camera; and
a processor in electronic communication with a memory device, the memory device storing instructions that, when executed by the processor, cause the processor to:
display visual content on the first display;
detect an external electronic device via the sensor, the external electronic device having a second display;
determine a position of the second display relative to the first display;
transmit a signal to the external electronic device to display additional visual content on the second display, wherein the additional visual content includes an extension of the visual content of the first display based on the position of the second display relative to the first display;
identify objects near the electronic device via the sensor; and
determine a location of the electronic device based on the objects identified near the electronic device.

32. The electronic device of claim 31, wherein the sensor further includes a radar, a LiDAR, an ultrasonic sensor apparatus, an ultra-wideband sensor, an accelerometer, an electric field sensor, a magnetic field sensor, or a gyroscope.

33. The electronic device of claim 31, wherein:
the sensor further includes a contact sensor; and
determining a position of the second display relative to the first display includes detecting contact between the first display and the second display using the contact sensor.

34. The electronic device of claim 31, wherein:
the instructions further cause the processor to split the visual content of the first display into two portions; and
the additional visual content includes one of the two portions of the visual content.

35. The electronic device of claim 31, wherein the additional visual content includes an enlarged portion of the visual content of the first display.

* * * * *